US008880061B2

(12) United States Patent
Bhalla

(10) Patent No.: US 8,880,061 B2
(45) Date of Patent: Nov. 4, 2014

(54) ENABLING HANDOFF FOR MULTIPLE PACKET DATA NETWORK CONNECTIONS

(75) Inventor: Rajesh Bhalla, Gahanna, OH (US)

(73) Assignee: ZTE (USA) Inc., Morristown, NJ (US)

( * ) Notice: Subject to any disclaimer, the term of this patent is extended or adjusted under 35 U.S.C. 154(b) by 316 days.

(21) Appl. No.: 13/340,595

(22) Filed: Dec. 29, 2011

(65) Prior Publication Data

US 2012/0172036 A1 Jul. 5, 2012

Related U.S. Application Data

(60) Provisional application No. 61/428,844, filed on Dec. 30, 2010.

(51) Int. Cl.
*H04W 4/00* (2009.01)
*H04W 36/00* (2009.01)

(52) U.S. Cl.
CPC ................................ *H04W 36/0033* (2013.01)
USPC ........ 455/432.1; 455/410; 455/411; 455/418; 455/419; 455/420; 455/435.1; 455/435.2; 455/435.3; 370/310

(58) Field of Classification Search
CPC .... H04W 36/0033; H04W 36/00; H04W 8/02
USPC ........... 455/410–411, 418–420, 435.1, 435.2, 455/435.3; 370/254, 310, 331, 328
See application file for complete search history.

(56) References Cited

U.S. PATENT DOCUMENTS

| 8,213,337 | B2 * | 7/2012 | Low et al. ..................... 370/254 |
| 8,358,602 | B2 * | 1/2013 | Puthiyandyil et al. ........ 370/310 |
| 8,553,647 | B2 * | 10/2013 | Akhtar .......................... 370/331 |
| 2010/0208704 | A1 * | 8/2010 | Wu ............................... 370/331 |
| 2012/0182940 | A1 * | 7/2012 | Taleb et al. ................... 370/328 |

* cited by examiner

*Primary Examiner* — Shahriar Behnamian
(74) *Attorney, Agent, or Firm* — Perkins Coie LLP

(57) ABSTRACT

Techniques for enabling handoff for multiple packet data network connection include selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN and exchanging messages to register the single PDN connection in the handover target AN.

19 Claims, 17 Drawing Sheets

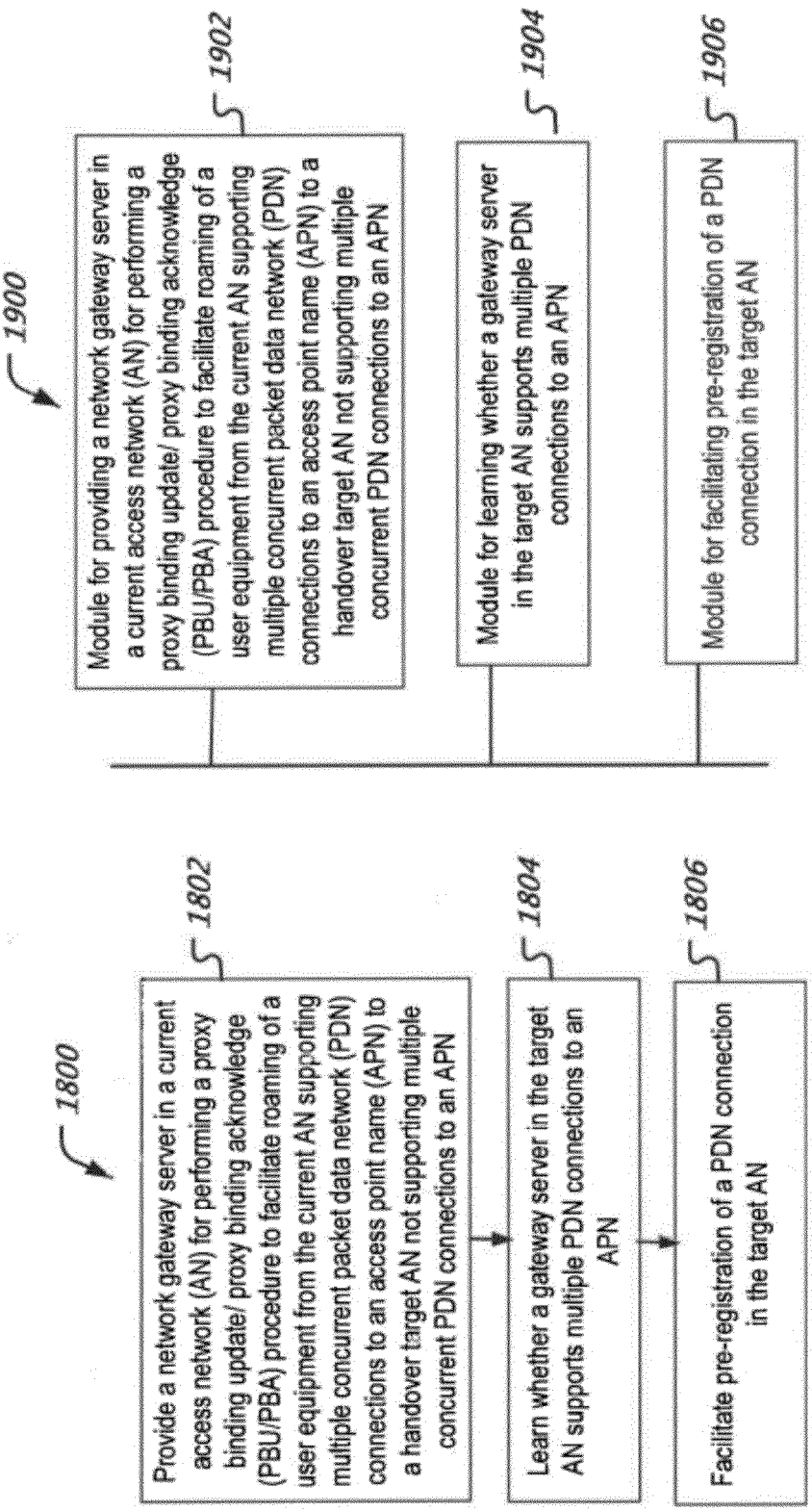

ENABLING HANDOFF FOR MULTIPLE PACKET DATA NETWORK CONNECTIONS

CROSS REFERENCE TO RELATED APPLICATIONS

This patent document claims the benefit of priority of U.S. Provisional Patent Application No. 61/428,844, entitled "Enabling Handoff for Multiple Packet Data Network Connections," filed on Dec. 30, 2010.

The entire content of the above referenced provisional patent application is incorporated by reference as a part of this patent document.

BACKGROUND

This patent document relates to wireless communications, wireless communication devices, wireless communications systems and related methods.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base station can be referred to as an access point (AP) or access network (AN) or can be included as part of an access network. Further, wireless communication systems communicate with each other or with wireline communication systems via one or more core networks. A wireless device can use one or more different wireless technologies (often concurrently) for communications. Various wireless technologies examples include Code Division Multiple Access (CDMA) such as CDMA2000 1x, High Rate Packet Data (HRPD), Global System for Mobile communications (GSM) based technologies, Long-Term Evolution (LTE), orthogonal frequency-division multiplexing (OFDM), and Worldwide Interoperability for Microwave Access (WiMAX). In some implementations, a wireless communication system can include multiple networks using different wireless technologies.

With the increased use and versatility of UEs (e.g., smartphones, phones with multiple network interfaces, and so on) has increased the technical challenges associated with providing seamless connectivity to UEs as UEs roam through different networks.

Techniques are needed for enabling handoff for multiple packet data network connections.

SUMMARY

This document describes technologies, among other things, for wireless communications.

In one aspect, a method for wireless communication comprising selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN and exchanging messages to register the single PDN connection in the handover target AN is disclosed.

In another aspect, an apparatus for wireless communications is disclosed. The apparatus includes a means for selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN and a means for exchanging messages to register the single PDN connection in the handover target AN.

In yet another aspect, a computer program product comprising a non-volatile, computer-readable medium is disclosed. The code comprises instructions for selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN and pre-registering for a PDN connection to an access point name (APN) that is to be maintained when operating into the handover target AN.

In yet another aspect, a disclosed wireless communications method includes providing a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN. The PBU/PBA procedure includes learning whether a gateway server in the target AN supports multiple PDN connections to an APN and facilitating pre-registration of a PDN connection in the target AN.

In yet another aspect, a system for wireless communications includes a user equipment configured to select, when roaming from a current access network (AN) supporting multiple concurrent packet data network (PDN) connections to a handover target AN not supporting multiple concurrent PDN connections, a single PDN connection, from among multiple active PDN connections, for operation in the handover target AN and exchange messages to register the single PDN connection in the handover target AN, and a gateway server configured to provide a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN learn whether a gateway server in the target AN supports multiple PDN connections to an APN, and facilitate pre-registration of a PDN connection in the target AN.

The details of one or more implementations are set forth in the accompanying attachments, the drawings, and the description below. Other features will be apparent from the description and drawings, and from the claims.

BRIEF DESCRIPTION OF THE DRAWINGS

FIG. 18 is a flow chart representation of a process for wireless communications.

FIG. 19 is a block diagram representation of a portion of a wireless communications apparatus.

Like reference symbols in the various drawings indicate like elements.

DETAILED DESCRIPTION

In the description below, techniques are provided for facilitating wireless communications. In one aspect, the provided techniques are useful to enable handoff for multiple packet data network connections.

Figure 1:
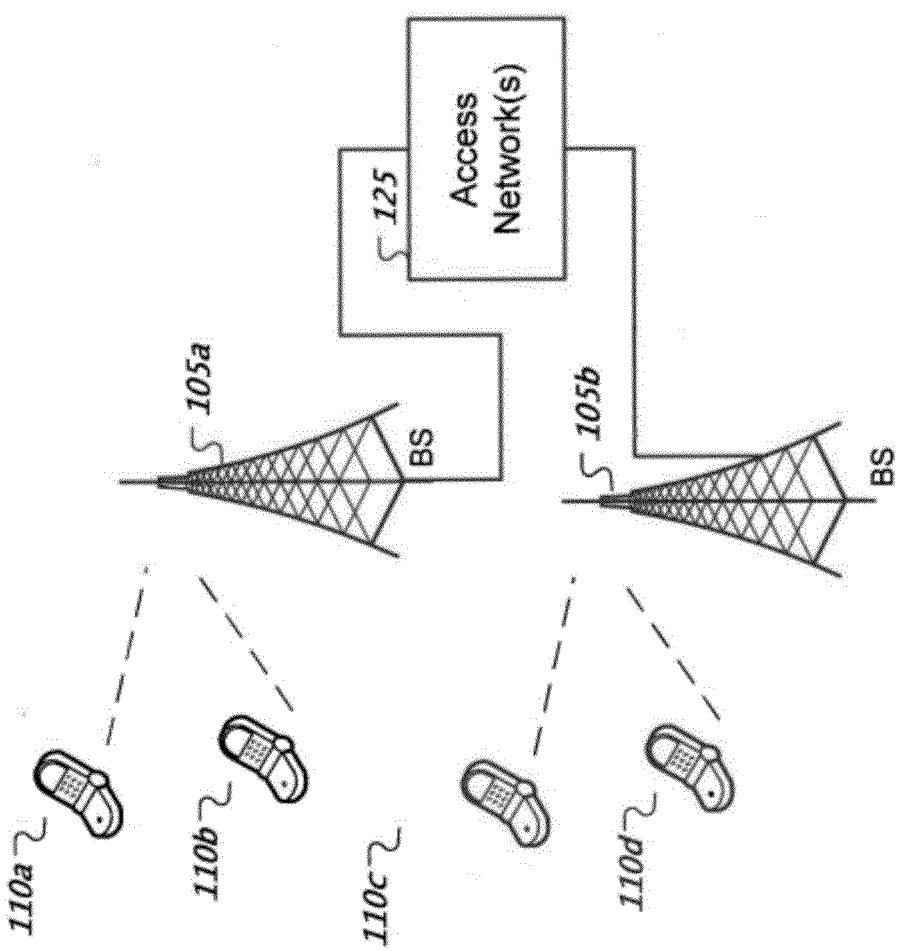
FIG. 1 shows an example of a wireless communication system.

FIG. 1 shows an example of a wireless communication system. A wireless communication system can include one or more base stations (BSs) 105a, 105b, one or more wireless devices 110 and an access network 125. Base station 105a, 105b can provide wireless service to wireless devices 110 in one or more wireless sectors. In some implementations, a base station (e.g., 105a or 105b) includes directional antennas to produce two or more directional beams to provide wireless coverage in different sectors.

The access network 125 can communicate with one or more base stations 105, 105b. In some implementations, the access network 125 includes one or more base stations 105, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110. A first base station 105 can provide wireless service based on a first radio access technology, whereas a second base station 105 can provide wireless service based on a second radio access technology. The base stations 105 may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
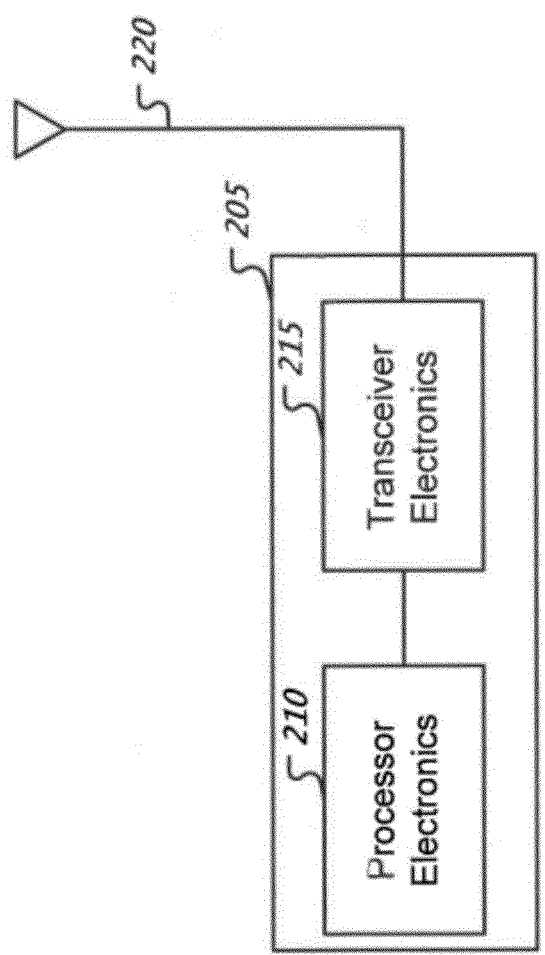
FIG. 2 shows an example of a radio station architecture.

FIG. 2 is a block diagram representation of a portion of a radio station 205. A radio station 205 such as a base station or a wireless device can include processor electronics 210 such as a microprocessor that implements one or more of the wireless communications techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

In eHRPD (enhanced High Rate Packet Data) network defined by 3GPP2, the UE provides IP services by attachment to the EPS (Evolved Packet System). EPS is specified by 3GPP TS 23.402 and other associated specifications. The HSGW (HRPD Serving Gateway) is the network edge entity that provides connectivity between the eHRPD network specified by the 3GPP2, and the EPS system specified by the 3GPP standards organizations. Details of HSGW functions and capabilities are being defined by 3GPP2 TSG-X Working Group.

The eHRPD network, that includes the User Equipment (UE) and the HSGW, provides IP environment that supports attachment to multiple Packet Data Networks (PDNs) by the allocation of individual IPv4 and/or IPv6 addresses to the UE for applications running on different PDNs. PDNs are also referred to by APN (Access Point Name) and reside within the EPS core network detailed by the 3GPP specifications. As an example of simultaneous applications at the UE that are homed on multiple PDNs, we can consider an internet browsing application running on the UE with the peer entity being in the Internet domain. At the same time the UE can have an ongoing conference call application that is anchored in the corporate domain. Such concept of support of multiple simultaneous applications on multiple PDNs is supported by Revision-0 of 3GPP2 'E-UTRAN-eHRPD Connectivity Specifications' (X.50057-0). In the 3GPP domain, equivalent set of specifications is referred to by Release-8 specifications.

Release-9 of 3GPP specifications takes the concept of multiple simultaneous applications on the UE a step further by allowing multiple applications to be running in the same PDN domain. The concept is termed as 'Multiple PDN Connections to an APN' (MUPSAP). For example, MUPSAP allows two or more applications such as internet browsing, ftp download, and conference call etc. to be running in the corporate domain at the same time. In this case, individual IPv4 and/or IPv6 addresses are allocated to the UE for applications homed in the same corporate (PDN) domain. 3GPP2 TSG-X Working Group is in the process of developing such MUPSAP capabilities in the Revision-A of 3GPP2 'E-UTRAN-eHRPD Connectivity Specifications' (X.50057-A).

Figure 3:
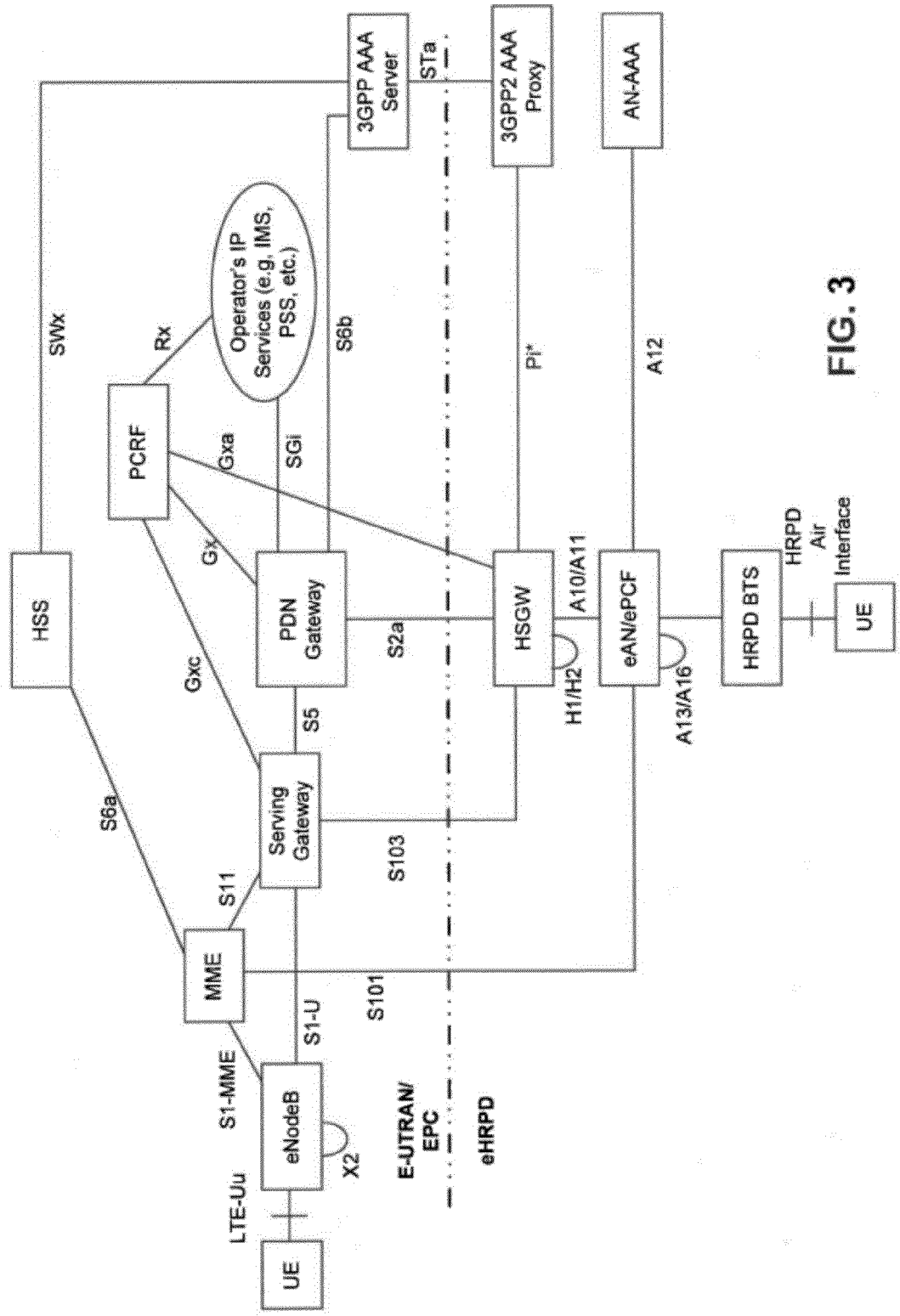
FIG. 3 is a block diagram showing an example E-UTRAN-eHRPD network architecture.

With reference to FIG. 3, an example of an E-UTRAN-eHRPD interworking architecture is shown.

eHRPD: Enhanced High Rate Packet Data
EPC: Evolved Packet Core
E-UTRAN: Evolved UTRAN (also known as LTE)
Inter-Working between 3GPP E-UTRAN and 3GPP2 eHRPD Networks The protocols specified in 3GPP TS 23.402 and associated specifications, and the 3GPP2 X.50057 specifications support interworking between the E-UTRAN (LTE) and eHRPD networks. As a UE moves between the coverage areas of E-UTRAN and eHRPD RAT (Radio Access Technology/Type) networks, seamless inter-technology mobility of calls is supported. Such inter-technology mobility/handoffs have been categorized as (a) Optimized Handoff/Handover, and (b) Non-Optimized Handoff/Handover.

Optimized handoff/handover involves the movement of the UE from E-UTRAN to eHRPD or vice-versa using tunneled signaling (i.e., S101 signaling over S101 interface shown in the architecture illustration) between the source access network and the target access network. While still on the source access network, the UE tunnels signaling to the target access network to 'pre-register' through the source access network, i.e., to create both a radio and an IP context on the target system. After pre-registration, the UE performs a radio-level handoff/handover to the target technology. Optimized Handoff/Handover applies to both Active and Idle (dormant) UEs.

Non-optimized handoff/handover involves the movement of the UE from E-UTRAN to eHRPD or vice-versa without the use of tunneled signaling (i.e., S101 signaling) between the source access network and the target access network. The UE leaves the radio environment of the source access network and performs a radio-level attachment to the target access network (e.g., creates an eHRPD session for the case of the UE moving from E-UTRAN to eHRPD), and then performs a handover attach procedure to the Packet Data Network(s) it had been communicating with over the source access network. Non-optimized Handoff/Handover applies to both Active and Idle (Dormant) UEs.

Issues with Handover in E-UTRAN and eHRPD

As stated earlier, the protocols specified in 3GPP TS 23.402 and associated specifications, and the 3GPP2 X.S0057 specifications support optimized and non-optimized handover between E-UTRAN and eHRPD radio/access networks. A 'Revision-0/Release-8' UE can support several simultaneous applications in multiple packet data domains. In addition, a 'Revision-A/Release-9' UE can support simultaneous multiple applications in each of the packet data domains (APNs). This later capability is termed as MUPSAP.

Revision-0/Release-8 Handoff/Handover

For the case of optimized handoff/handover, let us consider a UE has several simultaneous applications active in multiple PDNs/APNs (termed as PDN connections with each PDN connection identified by PDN-ID) while it is connected to the E-UTRAN access. Each packet data flow (bearer connection) for such multiple IP connections is identified by the assigned unique PDN-ID for each PDN connection for the UE. PDN-ID provides association between the IP packet bearer paths between the UE and the Serving Gateway (S-GW) in the E-UTRAN, and between the S-GW and the P-GW in the EPS domain. PDN-ID also provides association between the signaling paths for Policy and Charging Control (PCC) between the S-GW and the PCRF (Packet Charging Rules Function), and the P-GW and the PCRF. S-GW is the edge network entity in the E-UTRAN, similar to the HSGW in the eHRPD network.

While connected to the E-UTRAN access, the UE may recognize the presence of an eHRPD access network as a potential handover target. It then informs the E-UTRAN of the associated signal strength etc. of eHRPD access via CDMA measurements reports. The E-UTRAN network makes a Handover decision and sends appropriate signaling over the S101 interface to the eHRPD network, informing the later as a potential handover target. In order to prepare the eHRPD for a possible handover, the UE performs signaling (VSNCP signaling) for each PDN Connection (identified by a unique PDN-ID) with the HSGW in the eHRPD network, thereby performing 'pre-registration' of the active PDN Connections in the eHRPD domain (HSGW). Such pre-registration typically consists of setting of the PPP connection between the UE and the HSGW, performing UE authentication and authorization for eHRPD access and informing the eHRPD (HSGW) of the PDN Gateways (P-GWs) in the EPS domain that are providing IP connectivity services to the UE via different PDNs/APNs. Such pre-registration enables setting up of the time-consuming connectivity on the eHRPD/HSGW ahead of the actual handover to the eHRPD access. Such pre-registration however does not perform connectivity between the HSGW in the eHRPD domain and the P-GW in the EPS domain though. Therefore, the IP packet data flow continues between the UE and the P-GWs (in the EPS) via entities in the E-UTRAN domain.

Later, when the UE actually moves over to the eHRPD access, connectivity between the HSGW in the eHRPD domain and the P-GW in the EPS domain is performed. Such connectivity is performed by the use of Proxy Mobile IPv6 (PMIPv6) procedures by the exchange of Proxy Binding Update/Proxy Binding Acknowledge (PBU/PBA) messages between the HSGW and the P-GW. Such PBU/PBA procedures are performed for each of the pre-registered PDN Connection identified via PDN-ID at the HSGW. Connectivity between the E-UTRAN and eHRPD entities is enabled via S103 interface also, thereby enabling tunneling of data packets from the E-UTRAN to the eHRPD during UEs transition from E-UTRAN access to the eHRPD access. As the time consuming process of PPP setup, authentication/authorization and PDN Connection setup between the UE and the HSGW had been performed via pre-registration, the PBU/PBA procedures can be performed relatively quickly, hence the term 'Optimized Handover'.

For the case of non-optimized handoff/handover, connectivity between the E-UTRAN and eHRPD via the S101 interface does not exist. Hence pre-registration of PDN Connections in the eHRPD, while the UE is still on the E-UTRAN radio/access cannot be performed. When the UE moves over to the eHRPD access, the UE and the eHRPD network go through the process of PPP session setup, authentication/authorization and PDN Connections setup between the UE and the HSGW. PBU/PBA procedures are also performed between the HSGW and the P-GW to transition the IP connectivity from E-UTRAN to eHRPD. Relatively larger latency ensues in such transition of IP connectivity from the E-UTRAN access to the eHRPD access, with possible loss of data packets, hence the term 'Non-Optimized Handover'.

Figure 4:
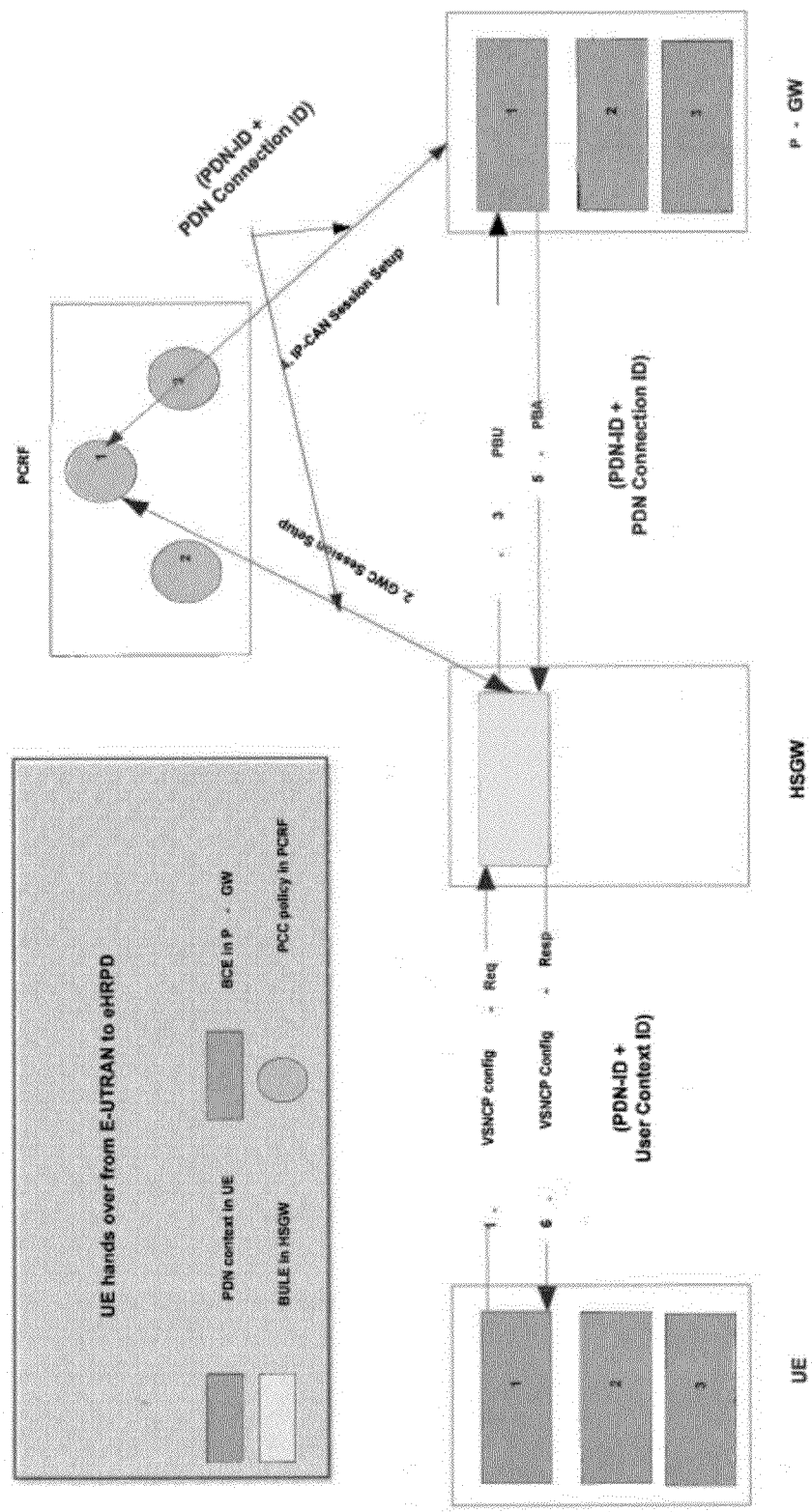
FIG. 4 shows an example association of bearer and signaling paths for a successful handover.

Revision-A/Release-9 Handoff/Handover:

All capabilities of Optimized and Non-Optimized handoff/handover of Revision-0/Release-8 are supported by the Revision-A/Release-9 systems. In addition, handover of MUPSAP PDN Connections is also supported by Revision-A/Release-9 systems. If a UE supports MUPSAP and both the E-UTRAN and the eHRPD networks support MUPSAP (i.e., are Release-9 and Revision-A capable respectively): then at the time of handover if the UE has multiple PDN Connections to a given APN (MUPSAP) in the E-UTRAN (source access), the UE supports MUPSAP connections in the eHRPD network (target access) also. As stated earlier each of the IP connectivity of the UE is uniquely identified by PDN-ID. In addition, each of the MUPSAP connections to a given APN is identified by another parameter as well. Such parameter is called 'LBI' (Linked EPS Bearer Id) in the E-UTRAN domain, 'User Context Identifier' in the eHRPD domain, and 'PDN Connection ID' in the EPS domain. For example, with such identifiers in place, successful MUPSAP handover from E-UTRAN to eHRPD results in the association of 'PDN-ID+User Context Id' between the UE and the HSGW; the association of 'PDN-ID+PDN Connection Id' between the HSGW and the P-GW; the association of 'PDN-ID+PDN Connection Id' between the HSGW and the PCRF (for PCC), and the association of 'PDN-ID+PDN Connection Id' between the P-GW and the PCRF. Such associations are illustrated in FIG. 4.

While on the topic of MUPSAP handover; as an example, the case of handover from E-UTRAN to eHRPD, with Release-9 capable E-UTRAN and Revision-0 capable eHRPD may be considered. Release-9 capable E-UTRAN implies that the UE and E-UTRAN support MUPSAP. Revision-0 eHRPD implies that the entities in the eHRPD domain do not support MUPSAP. While on the E-UTRAN access, the UE could have multiple PDN connections to a given APN (with unique pairing of PDN-ID+LBI). When the UE prepares for handover to the eHRPD, only a single PDN connection to a given APN (identified by a unique PDN-ID) can be handed over.

One of the issues in this case is which of the MUPSAP connections in E-UTRAN access should be handed over to the eHRPD access.

One of the thoughts for the selection of a MUPSAP connection when handing over from a MUPSAP capable source access to a non-MUPSAP capable target access would be for the UE to select the PDN Connection that corresponds to the most valuable ongoing application for that APN. For example if the UE has simultaneous web browsing, conference call and ftp download applications active via the corporate network (corporate APN), the most valuable PDN connection could be the conference call. In this example, the UE would want to maintain continuity of the conference call when the UE hands over from MUPSAP capable E-UTRAN source access to non-MUPSAP capable eHRPD target access.

As illustrated in FIG. 3 above, successful handover requires proper association of bearer and signaling segments in different entities in multiple domains. Random selection of one of the MUPSAP connections by the UE (e.g., as discussed above) might result in not being able to maintain proper association of different bearer and signaling components.

For example, let us assume that the UE and the E-UTRAN support MUPSAP and the HSGW in eHRPD domain does not support MUPSAP. As the HSGW does not support MUPSAP, the HSGW does not understand the 'User Context Identifier' parameter that is used to identify different PDN Connections to a given APN. When the UE performs pre-registration of PDN Connections at the HSGW, while still on the E-UTRAN access, only one PDN Connection per APN can be pre-registered at the HSGW, whereas multiple PDN Connections to a given APN could be active while the UE is on E-UTRAN access. Continuing with our example application scenario, the UE activates web browsing application via corporate APN while on E-UTRAN access, and such PDN Connection is pre-registered on the HSGW in the eHRPD domain. Later, while still in the pre-registration state in the E-UTRAN access, the UE activities conference call application via the corporate APN. The UE pre-registers the PDN connection corresponding to the conference call application at the HSGW. As the HSGW supports only a single PDN Connection per APN (non-MUPSAP), the previous pre-registration for web browsing application gets overwritten by the pre-registration for the conference call application. Sometime later, while still on the E-UTRAN access, the UE initiates the ftp application via the corporate APN. The UE pre-registers this ftp application PDN Connection also on the HSGW in the eHRPD domain. The ftp application pre-registration overwrites the conference call pre-registration at the HSGW. Sometime later, the UE hands over to the eHRPD access. As per the possible requirement discussed above, the UE would want to maintain connectivity for the conference call application when it hands over to non-MUPSAP eHRPD access. However, the HSGW has pre-registration context for the PDN Connection for the corporate APN that was pre-registered 'last'—i.e., for the ftp application. Hence proper association between the bearer component between the UE and the HSGW cannot be ensured.

A similar scenario could be described when the UE and the E-UTRAN support MUPSAP. The HSGW in the eHRPD domain also supports MUPSAP. So pre-registration of all MUPSAP connections that are active while the UE is on E-UTRAN access can be ensured at the HSGW. However, in this example, the P-GW in the EPS domain does not support MUPSAP. Therefore, the P-GW does not understand the 'PDN Connection ID' parameter. The context at the P-GW will correspond to the 'last' PDN Connection for that given APN—in this case the ftp application. Again, the UE is not at the liberty of selecting a MUPSAP connection randomly.

Therefore, some rules need to be defined to ensure successful handover from a source access that supports MUPSAP to a target access that does not support MUPSAP. Though the above example scenarios describe handover from E-UTRAN to eHRPD for Optimized handover case only; such rules are needed for non-optimized handover also. Such rules are needed for handover from MUPSAP capable eHRPD source access to a non-MUPSAP capable E-UTRAN target access also.

Example Rules:

The following are the rules for handover from MUPSAP capable source access to non-MUPSAP capable target access:

If the UE hands over between a source access and a target access networks, and the UE has more than one PDN connection to a given APN in the source access and multiple PDN connections to a single APN are not supported via the target access, only one PDN connection to the given APN will be established in the target access.

In order for the network entities to select the same PDN connection when the UE moves to non-MUPSAP target access, out of the active PDN connections for a given APN while on MUPSAP capable source access, the UE will select the latest PDN connection out of the active PDN connections for the given APN while on MUPSAP capable source access, i.e. the PDN connection that was activated last out of the active PDN connections for the given APN.

Figure 5:
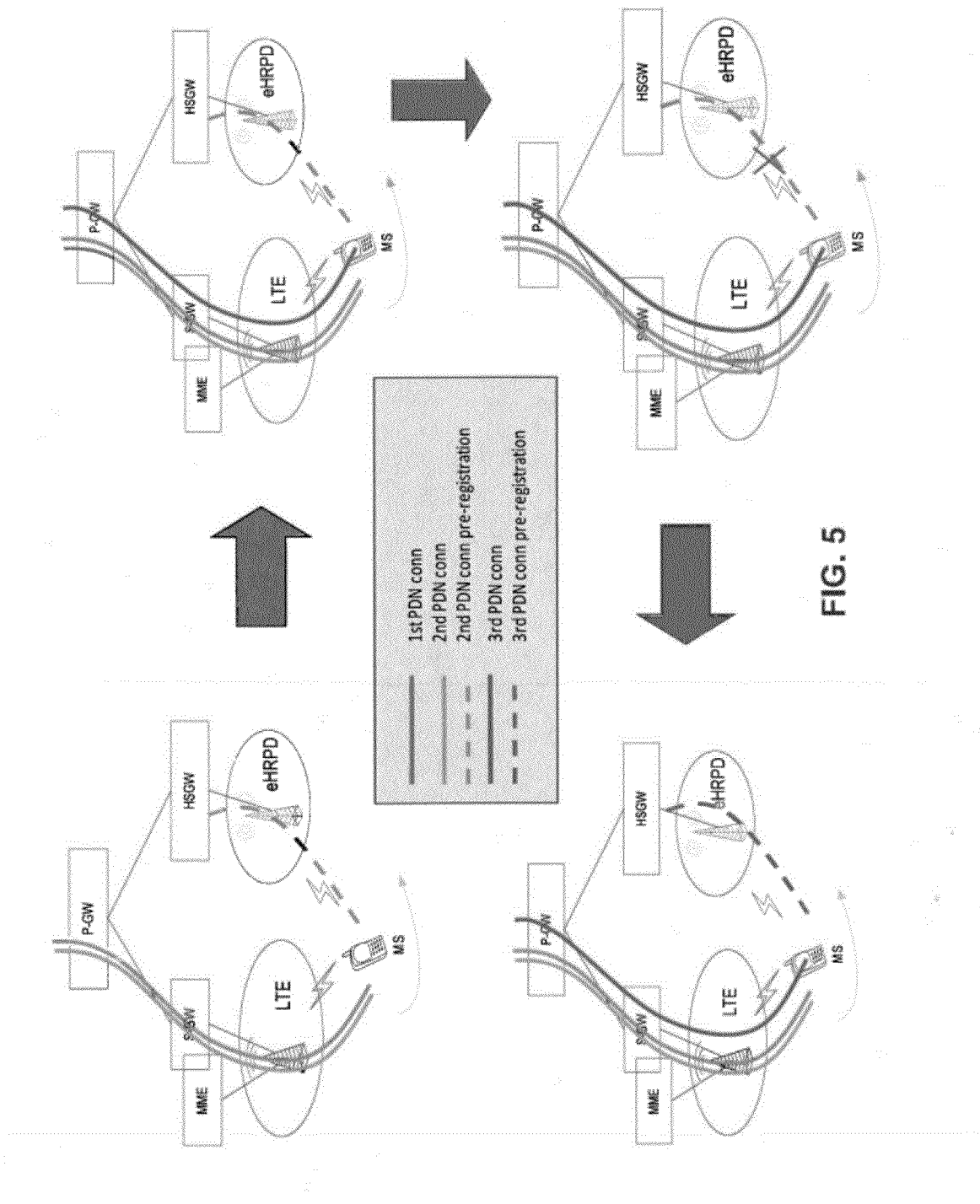
FIG. 5 shows the addition of a PDN connection in a MUP-SAP source access architecture.

While on MUPSAP capable source access, if a new PDN connection to a given APN is established and there is already a pre-registered PDN connection for that APN in the target access, then the pre-registered PDN connection in non-MUP-SAP is not the latest PDN connection for that APN. In this case, the formerly pre-registered PDN connection in the non-MUPSAP target access will be deleted and the newly established PDN connection will be pre-registered. See FIG. 5 for illustration Addition of a PDN Connection in MUPSAP Source Access—Pre-Registration of Last PDN Connection in Non-MUPSAP Target Access.

Figure 6:
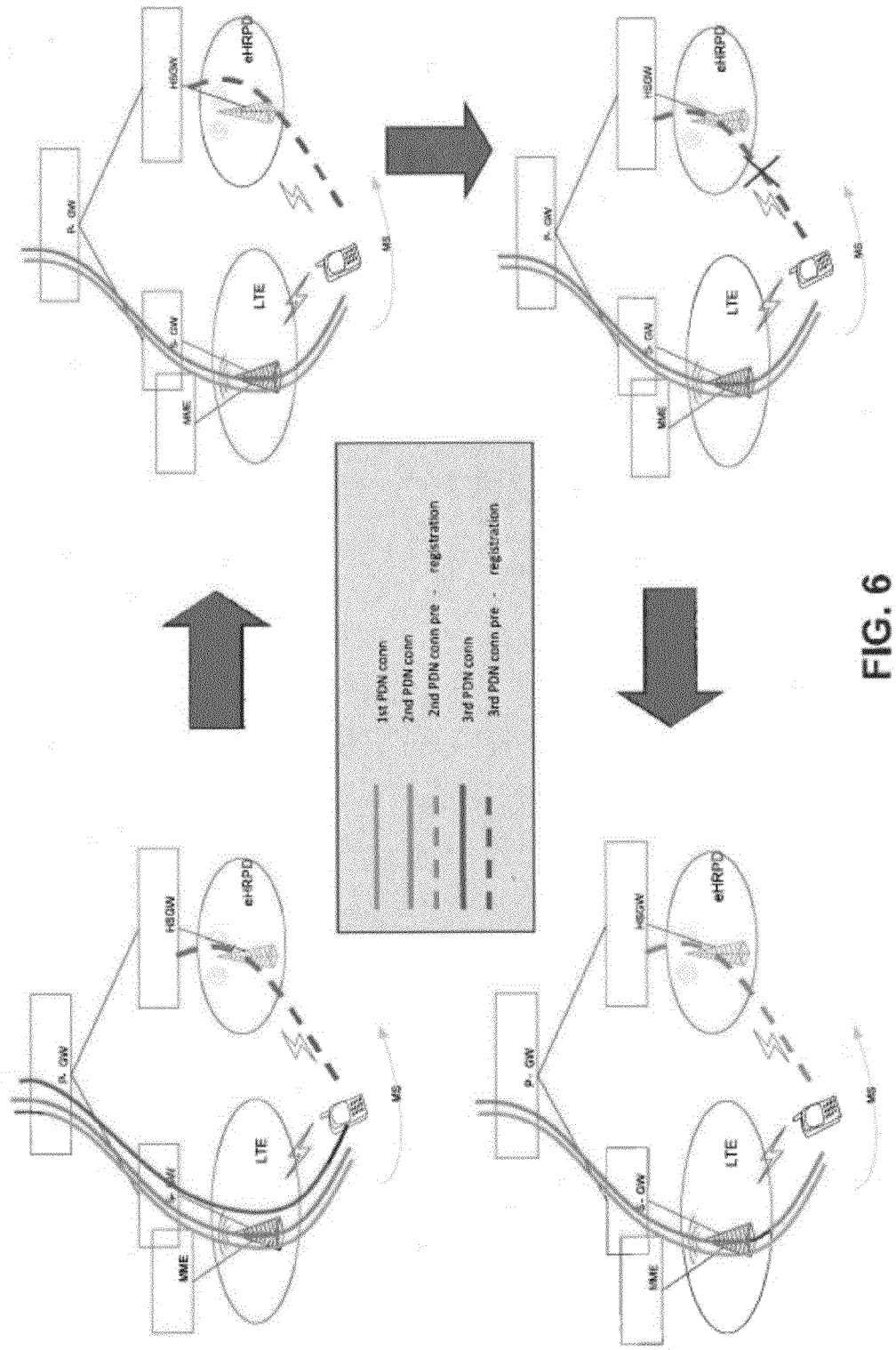
FIG. 6 shows the deletion of a PDN connection in a MUP-SAP source access architecture.

While on MUPSAP capable source access, if the latest pre-registered PDN connection is deleted, then the pre-registered information in the target access is useless. In this case the second-latest PDN connection becomes the latest PDN connection while the UE is still on the MUPSAP capable source access. The formerly pre-registered PDN connection in the non-MUPSAP target access will be deleted and the second-latest PDN connection will be pre-registered in the target access. See FIG. 6 for illustration of Deletion of Last PDN Connection in MUPSAP Source Access—Pre-Registration of Second-Last PDN Connection in Non-MUPSAP Target Access.

3GPP2 TSG-X Specific MUPSAP Capabilities:

As stated earlier, 3GPP2 TSG-X is in the process of defining procedures for supporting MUPSAP, possibly in the Release-A version of X.50057 specifications. Continuing with the rules stated above, the following set of rules is proposed for handover from MUPSAP capable E-UTRAN access to Non-MUPSAP capable eHRPD access.

With reference to FIGS. 7, 8, 9, 10, 11, 12, 13, 14, and 15, various examples of messages exchanged during optimized handoffs and non-optimized handoffs in wireless networks are provided. These message exchanges are further described below.

The following rules are for the case of Optimized Handover. In this scenario, the UE and the E-UTRAN support MUPSAP and the HSGW does not support MUPSAP. The rules assume the use of the S101 interface to tunnel eHRPD signaling between the UE and the eAN/ePCF (in eHRPD domain).

If the UE does not know if eHRPD system supports MUP-SAP, the UE performs pre-registration for a PDN connection to a given APN that it wants to maintain in the eHRPD system by including the User Context Identifier configuration option in the VSNCP Configure-Request message. The UE learns that eHRPD system does not support MUPSAP when it receives VSNCP Configure-Ack message without the User Context Identifier configuration option.

The UE may learn that eHRPD system does not support MUPSAP via the ANDSF function, if available, or via VSNCP signaling procedures. Once the UE knows that the HSGW does not support MUPSAP, the UE performs pre-registration in the eHRPD system for the latest PDN connection to a given APN, if already not performed previously. The UE may not include the User Context Identifier configuration option in the VSNCP Configure-Request message.

During pre-registration maintenance period, if a new PDN connection to the same APN is established in the E-UTRAN system, the formerly pre-registered PDN connection context may be deleted and the newly established PDN connection to the APN may be pre-registered in the eHRPD system.

During pre-registration maintenance period, if the PDN connection to an APN that is pre-registered at the eHRPD system is released in the E-UTRAN system, then the pre-registered PDN connection context is deleted and the previous (second-latest) PDN connection to the same APN, if available, may be pre-registered in the eHRPD system.

The following rules are for the case of Active Mode Optimized Handover. In this scenario, the UE has pre-registered with eHRPD, that the PPP inactivity timer is still running, and that the HSGW has full context for the UE (except for PMIP bindings). It is also assumed the P-GW does not support multiple PDN connections to a single APN (MUPSAP).

If the HSGW supports MUPSAP and HSGW does not know if P-GW supports MUPSAP and the HSGW has multiple pre-registered PDN connections to a given APN, the HSGW performs PBU/PBA procedure with the P-GW for a PDN connection to a given APN that it wants to maintain in the eHRPD system by including the PDN Connection Id information element. The HSGW learns that P-GW does not support MUPSAP when it receives PBA success message without PDN Connection Id information element.

If the HSGW supports MUPSAP, and HSGW does not know if P-GW supports MUPSAP and the HSGW has only one pre-registered PDN connection an given APN, the HSGW performs PBU/PBA procedure with the P-GW for that PDN connection to a given APN by including the PDN Connection Id information element in the PBU message. The HSGW learns that P-GW does not support MUPSAP when it receives PBA success message without PDN Connection Id information element.

If the HSGW supports MUPSAP and once it learns that the P-GW does not support MUPSAP, it performs PBU/PBA procedures with the P-GW for the latest pre-registered PDN connection to a given APN, if not already performed as discussed previously. The HSGW may not include the PDN Connection ID information element in the PBU message.

In case the HSGW does not support MUPSAP, it performs PBU/PBA procedures with the P-GW for the (only) pre-registered PDN connection to a given APN. The HSGW may not include the PDN Connection ID information elements in the PBU message.

The following rules are for the case of Idle Mode Optimized Handover. In this scenario, the UE has a dormant PPP session in the target HSGW through the pre-registration procedure. It is assumed that the UE has pre-registered with eHRPD, that the PPP inactivity timer is still running, and that the HSGW has full context for the UE (except for PMIP bindings). It is also assumed the P-GW does not support multiple PDN connections to a single APN (MUPSAP).

If the HSGW supports MUPSAP, and HSGW does not know if P-GW supports MUPSAP and the HSGW has multiple pre-registered PDN connections to a given APN, the HSGW performs PBU/PBA procedure with the P-GW for a PDN connection to a given APN that it wants to maintain in the eHRPD system by including the PDN Connection Id information element in the PBU message. The HSGW learns that P-GW does not support MUPSAP when it receives PBA success message without PDN Connection Id information element.

If the HSGW supports MUPSAP, and HSGW does not know if P-GW supports MUPSAP and the HSGW has only one pre-registered PDN connection an given APN, the HSGW performs PBU/PBA procedure with the P-GW for that PDN connection to a given APN by including the PDN Connection Id information element in the PBU message. The HSGW learns that P-GW does not support MUPSAP when it receives PBA success message without PDN Connection Id information element.

If the HSGW supports MUPSAP and once it learns that the P-GW does not support MUPSAP, it performs PBU/PBA procedures with the P-GW for the latest pre-registered PDN connection to a given APN, if not already performed as discussed previously. The HSGW does not include the PDN Connection ID information elements in the PBU message.

In case the HSGW does not support MUPSAP, it performs PBU/PBA procedures with the P-GW for the (only) pre-registered PDN connection to a given APN. The HSGW does not include the PDN Connection ID information elements in the PBU message.

The following rules are for the case of Non-Optimized Handover—when the UE knows eHRPD (HSGW) and/or the P-GW do not support MUPSAP. In this scenario, the following procedures will be performed for each APN.

The UE selects the latest PDN connection to a given APN that it wants to maintain on the eHRPD system for creating a PDN connection on the eHRPD system. The procedures may be performed for the selected PDN connection. The UE does not include the User Context Identifier configuration option in the VSNCP Configure-Request message.

The following rules are for the case of Non-Optimized Handover—when the UE does not know that eHRPD system (HSGW) and/or the P-GW support MUPSAP. In this scenario, the following procedures will be performed for each APN.

If the UE does not know if eHRPD system supports MUPSAP and the UE has multiple PDN connections to a given APN, the UE selects a PDN connection to a given APN that it wants to maintain in the eHRPD system while performing the procedures subject to the limitation that such procedures may be performed only for the selected PDN connection to a given APN. The UE includes the User Context Identifier configuration option in the VSNCP Configure-Request message. The UE learns that eHRPD system does not support MUPSAP when it receives VSNCP Configure-Ack message without the User Context Identifier configuration option.

If the UE does not know if eHRPD system supports MUPSAP and the UE has only one PDN connection to a given APN, the UE selects that PDN connection to a given APN. The UE includes the User Context Identifier configuration option in the VSNCP Configure-Request message. The UE learns that eHRPD system does not support MUPSAP when it receives VSNCP Configure-Ack message without the User Context Identifier configuration option.

Once the UE knows that the eHRPD system does not support MUPSAP, the UE establishes PDN connection for the latest PDN connection to an APN, if the latest PDN connection is not the PDN connection selected in the steps disclosed above. The UE does not include the User Context configuration option in the VSNCP Configure-Request message. If the latest PDN connection to an APN is different from the PDN connection selected as discussed above, the HSGW terminates the GW Control Session relating to the PDN connection selected as discussed above, if GW Control Session establishment for such PDN connection has already been performed.

Some example message flows are now discussed.

Figure 7:
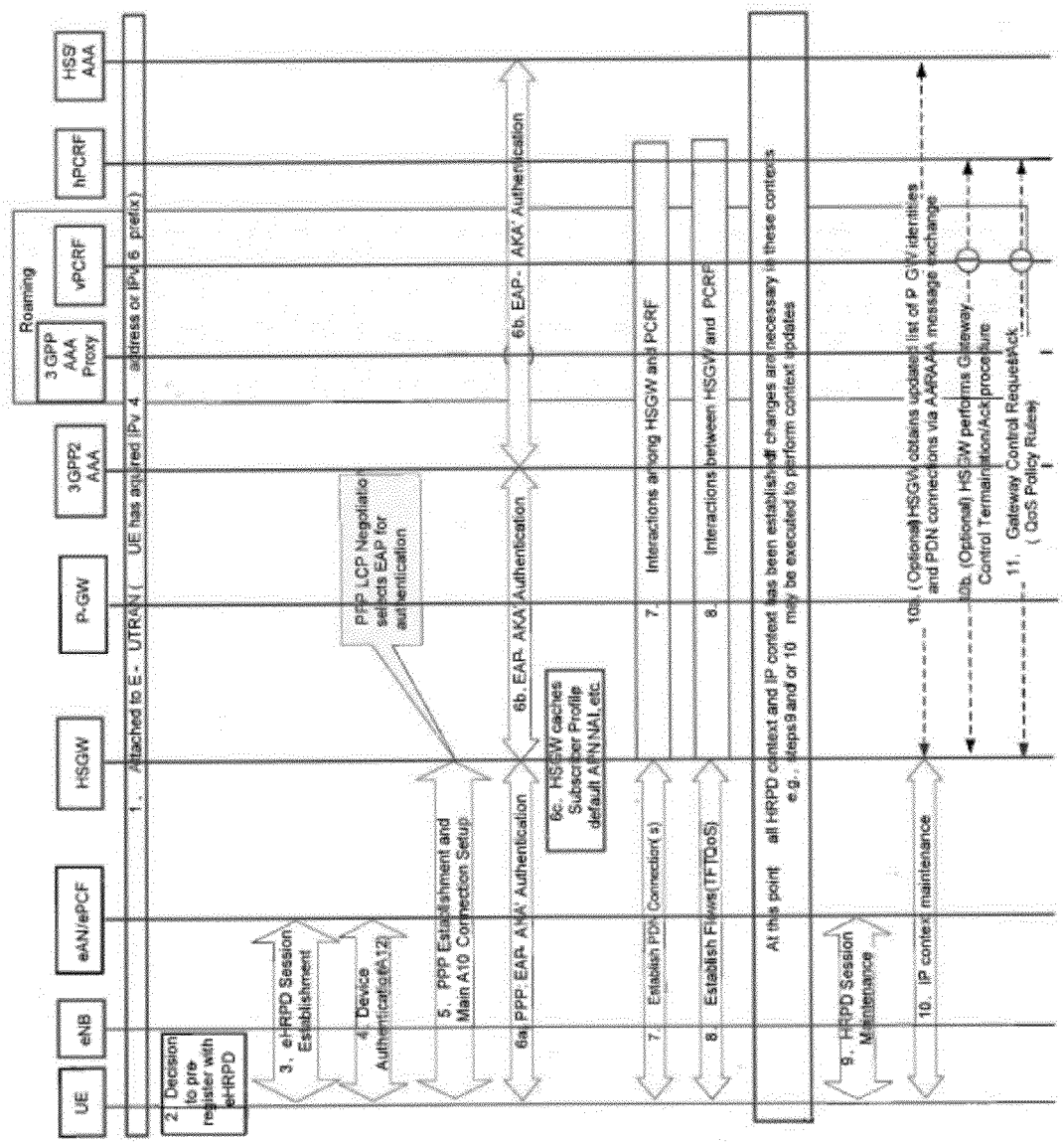
FIG. 7 shows example messages exchanged during eHRPD pre-registration via E-UTRAN.

With reference to FIG. 7, (1) the UE is initially attached to the E-UTRAN. The UE acquires IPv4 address(es) and/or IPv6 prefix(es). Data flows between the UE and the P GW(s) through the eNodeB and the SGW. (2) Based on a Radio Layer trigger, the UE decides to initiate a pre-registration procedure with potential target eHRPD access. It is assumed that an S101 signaling relationship exists between the MME and eAN/ePCF. (3) The UE initiates the establishment of a new session in the eHRPD system through the S101 tunnel.

(4) If RAN-level authentication is required, the UE establishes an AN-PPP connection with the eAN/ePCF and performs RAN-level authentication using the A12 interface. For details refer to A.S0022-0.

(5) The eHRPD eAN/ePCF establishes the main A10 connection with the HSGW by exchanging A11-RRQ/RRP messages. The A11-Registration Request message contains an indication that the access is occurring through the S101 tunnel. For details refer to A.S0022-0. This information is used by the HSGW in step 7 to defer interaction with the P-GW. The UE and HSGW initiate the PPP connection establishment procedure.

(6a and 6b) The UE performs user authentication and authorization in the eHRPD access system using EAP-AKA'. The EAP-AKA' messages are transferred between the UE and HSGW over PPP. The EAP authenticator resides in the HSGW. The 3GPP AAA server authenticates and authorizes the UE for access in the eHRPD system. The 3GPP AAA server queries the HSS and returns the subscription profile, and APN and P-GW address pair for each PDN connection to the eHRPD system in this step. The 3GPP AAA server also returns the NAI to be used to identify the UE in Proxy Binding Update message.

(6c) The HSGW stores the information received from the 3GPP AAA/HSS server.

(7) The UE exchanges VSNCP messages with the HSGW for each PDN connection (Steps 8 through 17 are well known in the art) that it currently has attachments to within E-UTRAN and that it wants to maintain on eHRPD. The UE sets the Attach Type to "handover" in the VSNCP Configure-Request message. Also, the UE includes the IP address(es) it obtained via LTE in the VSNCP Configure-Request message. If the PDN Type is IPv6 or IPv4v6, the UE includes the IPv6 HSGW Link Local Address IID option and sets the value to all zeros in the VSNCP Configure-Request message. The HSGW includes the IPv6 HSGW Link Local Address IID option and sets the value to the interface ID of the HSGW link local address in the VSNCP Configure-Ack message. Interactions occur among the HSGW and PCRF per 3GPP specifications (TS23.402 section 9.3.1). The HSGW exchanges Gateway Control Session Establishment/Ack messages with the hPCRF to obtain QoS policy rules required to perform bearer binding update for all the active IP flows. As shown in the figure for the roaming scenario, the policy interactions between the hPCRF in the HPLMN and the HSGW are relayed via the vPCRF in the VPLMN.

NOTE: The HSGW defers interaction with the P-GW until the UE arrives in eHRPD, at which time it sends a PBU to the P-GW to complete the PDN connection.

(8) The network initiates resource reservation procedures to establish all bearers. At this point the UE is registered in the eHRPD access system and it has been authenticated by the AAA/HSS. At this point HRPD context and IP context have also been established for the PDN connections UE wants to maintain on the eHRPD. If changes are necessary to these contexts, steps 9 and/or 10 may be executed to perform context updates.

(9) It may become necessary to modify the eHRPD radio session configuration between the UE and the eAN/ePCF. For example, this may be necessary as a result of moving under the coverage area of a new eAN/ePCF. This is accomplished by eHRPD signaling exchanges between the UE and the eAN/ePCF via S101 tunneling.

(10) If any bearer is added, modified, or deleted while the UE is operating on E-UTRAN, similar changes are made in the context between the UE and the HSGW. This is accomplished by signaling those changes between the UE and HSGW via S101 tunneling. Likewise, if any PDN connection is added, or deleted while the UE is operating on E-UTRAN, similar changes are made in the HSGW via the use of VSNCP.

(10a) If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW. The exchanges of AAR/AAA messages are not shown in the figure.

(10b) If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

(11) If not already initiated, PCRF interactions due to session maintenance can be initiated by the PCRF or the HSGW. The PCRF initiates the Gateway Control and QoS Rules Provision Procedure specified in TS 23.203. The HSGW initiates the Gateway Control and QoS Policy Rules Request Procedure as specified in TS 23.203.

Figure 8:
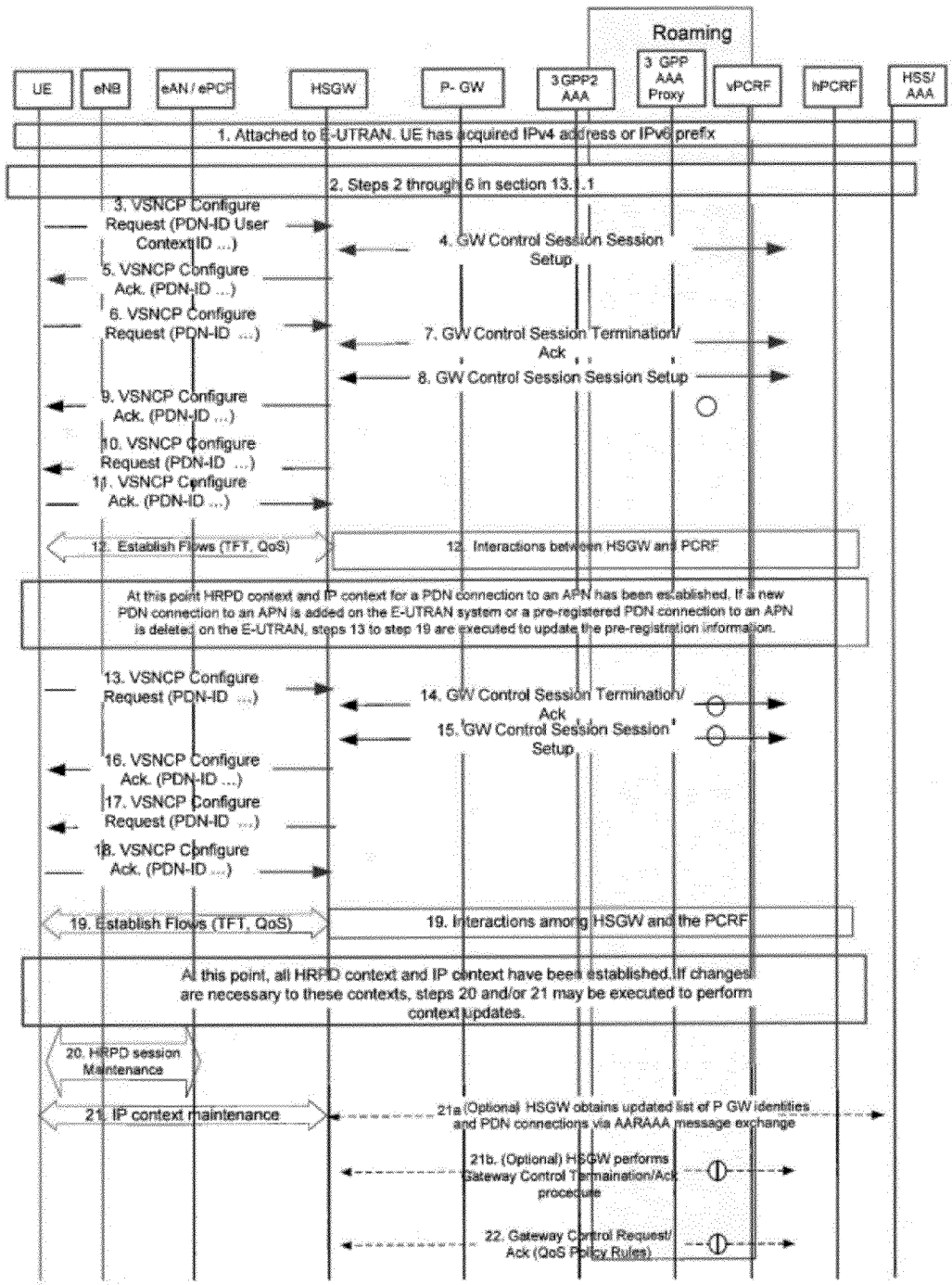
FIG. 8 shows example messages exchanged during eHRPD pre-registration via E-UTRAN when HSGW does not support MUPSAP.

With reference to FIG. 8, example signals exchanged among various network entities are as follows.

(1) The UE is initially attached to the E-UTRAN. The UE acquires IPv4 address(es) and/or IPv6 prefix(es). Data flows between the UE and the P GW(s) through the eNodeB and the S-GW.

(2) Based on a Radio Layer trigger, the UE decides to initiate a pre-registration procedure with potential target eHRPD access. It is assumed that an S101 signaling relationship exists between the MME and eAN/ePCF. The UE performs steps to setup PPP connection with the selected HSGW and perform UE authentication on the eHRPD access. The UE performs step-3 to step-11 for each APN that it has attachment to within the E-UTRAN system and it wants to maintain in the HRPD system. In case the UE already knows that the HSGW does not support MUPSAP, setp-3 to step-6 are not performed.

(3) The UE sends a VSNCP Configure-Request message over the main service connection for a PDN connection to a given APN that it wants to maintain in the eHRPD system. The information in the message includes PDN-ID, User Context Identifier, PDN Type, APN, PDN Address, Protocol Configuration Options, and Attach Type="Handover". Other configuration options may be included.

(4) The HSGW may perform Gateway Control Session setup procedure with the PCRF. If performed, the HSGW indicates the possible bearer control modes according to the UE capability provided in step 3 and its own capability. The PCRF selects the bearer control mode to be used.

(5) As the HSGW does not support MUPSAP, it returns VSNCP Configure-Ack message without the User Context Identifier configuration option. Now the UE knows that HSGW does not support MUPSAP. In case the selected PDN connection to an APN in step-3 is the latest PDN connection to that APN, step-6 through step-9 are not performed for that APN.

(6) The UE sends a VSNCP Configure-Request message over the main service connection for the latest PDN connection to a given APN. The information in the message includes PDN-ID, PDN Type, APN, PDN Address, Protocol Configuration Options, and Attach Type="Handover".

(7) The HSGW performs GW Control Session Termination/Ack procedures with the PCRF to remove the GW Control context of the previously pre-registered PDN context at the HSGW, if such GW Control Session context had been setup in step-4.

(8) The HSGW may perform Gateway Control Session setup procedure with the PCRF. If performed, the HSGW indicates the possible bearer control modes according to the UE capability provided in step 6 and its own capability. The PCRF selects the bearer control mode to be used.

(9) The HSGW sends a VSNCP Configure-Ack (PDN-ID, APN, PDN Address, PCO, Attach Type, and Address Allocation Cause) message to the UE over the main service connection. Other configuration options may be included.

Step-10 and Step-11 may be performed right after step-5 also. If so performed, the information in step-10 performed after step-9 overwrites information in step-10 performed right after step 5.

(10) The HSGW sends a VSNCP Configure-Request message to complete the protocol specified in RFC 3772. The message includes the PDN-ID configuration option.

(11) The UE responds with a VSNCP Configure-Ack message.

(12) The network initiates resource reservation procedures to establish all bearers. At this point, HRPD context and IP context for a PDN connection to an APN have been established at the HSGW. If a new PDN connection to an APN is added on the E-UTRAN system, or a pre-registered PDN connection to an APN is deleted on the E-UTRAN system. step-13 through step-19 are performed to update pre-registration information at the HSGW.

(13) The UE exchanges VSNCP messages with the HSGW for updating the pre-registration context at the HSGW.

a. If a PDN connection to an APN is added on the E-UTRAN system, the UE sends a VSNCP Configure-Request message with PDN-ID of the new PDN connection to the said APN for updating the pre-registration context at the HSGW. Attach type is set to 'Handover'. Other configuration options are included as specified in step-6 above.

b. If a pre-registered PDN connection to an APN is released in the E-UTRAN system, the UE sends a VSCNP Configure-Request message with the PDN-ID of the previous (second latest) PDN connection to the same APN, if available, to update the pre-registration context at the HSGW. Attach type is set to "Handover". Other configuration options are included as specified in step-6 above.

c. If a PDN connection to a new APN is added on the E-UTRAN, then IP context maintenance procedures in step 21 are performed.

d. If a pre-registered PDN connection to an APN is released in the E-UTRAN system and there are no other PDN connections to the said APN, then IP context maintenance procedures in step 21b are performed.

(14) For the case 13(a) and 13(b) above, the HSGW performs GW Control Session Termination/Ack procedures with the PCRF to remove the GW Control context of the previously pre-registered PDN context at the HSGW, if such GW Control Session context had been setup in step-4 or setp-8.

(15) For the case 13(a) and 13(b) above, the HSGW may perform Gateway Control Session setup procedure with the PCRF for the newly identified pre-registered context at the HSGW. If performed, the HSGW indicates the possible bearer control modes according to the UE capability provided in step 13 and its own capability. The PCRF selects the bearer control mode to be used.

(16) The HSGW sends a VSNCP Configure-Ack (PDN-ID, APN, PDN Address, PCO, Attach Type, and Address Allocation Cause) message to the UE over the main service connection. Other configuration options may be included as specified in step-9 above.

(17) The HSGW sends a VSNCP Configure-Request message to complete the protocol specified in RFC 3772. The message includes the PDN-ID configuration option.

(18) The UE responds with a VSNCP Configure-Ack message.

(19) The network initiates resource reservation procedures to establish all bearers.

At this point all HRPD context and IP context have been established. If changes are necessary to these contexts, step-20 and/or step-21 may be executed to perform context updates.

(20) It may become necessary to modify the eHRPD radio session configuration between the UE and the eAN/ePCF. For example, this may be necessary as a result of moving under the coverage area of a new eAN/ePCF. This is accomplished by eHRPD signaling exchanges between the UE and the eAN/ePCF via S101 tunneling.

(21) If any bearer is added, modified, or deleted while the UE is operating on E-UTRAN, similar changes are made in the context between the UE and the HSGW. This is accomplished by signaling those changes between the UE and HSGW via S101 tunneling. Likewise, if any PDN connection is added, or deleted while the UE is operating on E-UTRAN, similar changes are made in the HSGW via the use of VSNCP.

a. If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW. The exchanges of AAR/AAA messages are not shown in the figure.

b. If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

(22) If not already initiated, PCRF interactions due to session maintenance can be initiated by the PCRF or the HSGW. The PCRF initiates the Gateway Control and QoS Rules Provision Procedure specified in TS 23.203.

Figure 9:
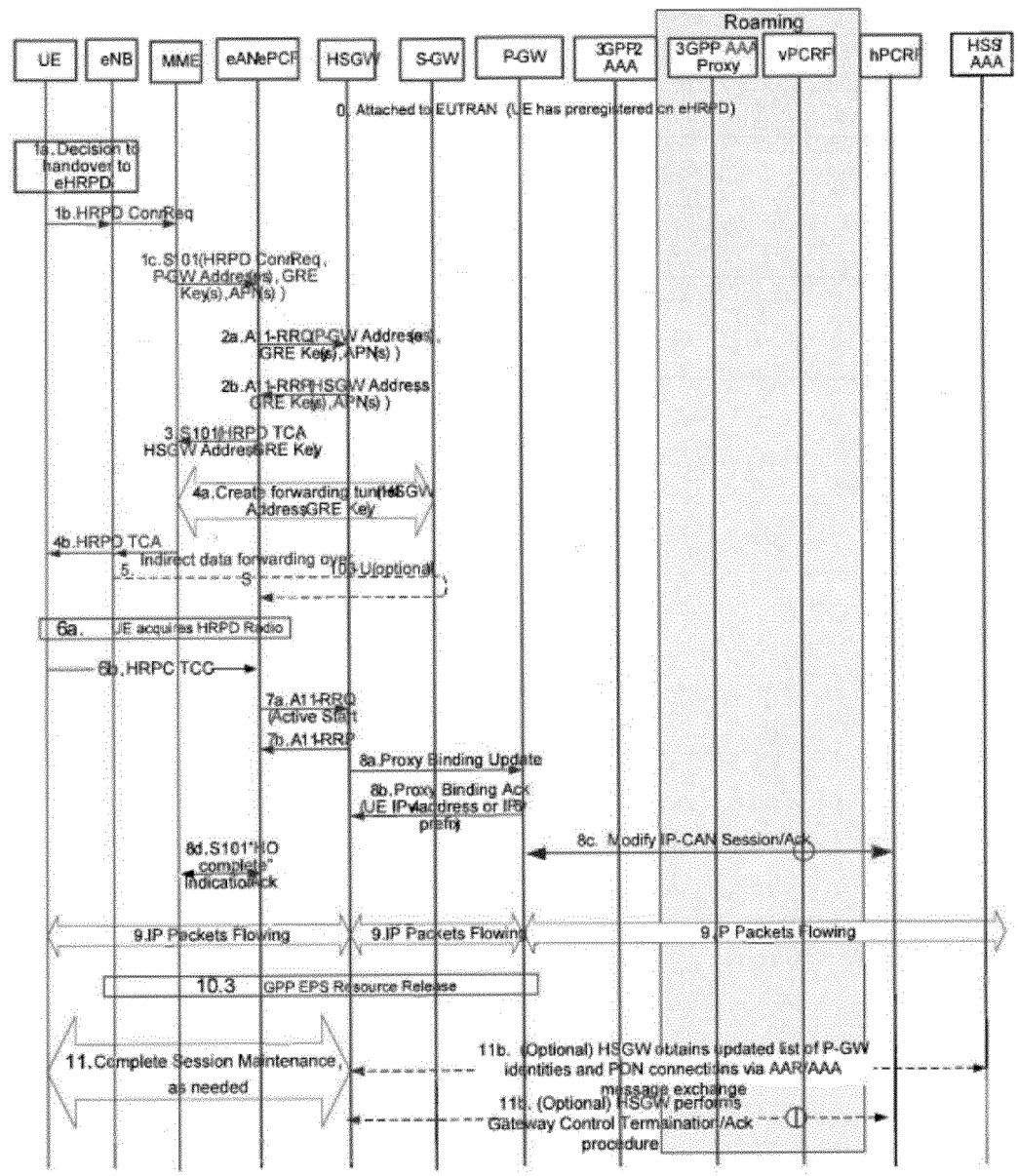
FIG. 9 shows example messages exchanged during an active mode optimized handoff from E-UTRAN to eHRPD.

With reference to FIG. 9, an example of messages exchanged during active mode optimized handoff are described below.

(1a) E-UTRAN receives CDMA measurement reports from the UE and makes a HO decision.

(1b) UE sends an HRPD Connection Request message to the E-UTRAN to request an HRPD traffic channel. This request is forwarded to the MME. See TS 23.402 for details.

(1c) The MME sends the P GW address(es) and the associated APNs and the uplink GRE key(s) for each PDN connection along with the HRPD Connection Request message to the eHRPD access node over the S101 tunnel.

NOTE: The GRE keys (one for each PDN connection) sent in step 1c are further sent in step 2a to the HSGW, and the HSGW uses them for uplink traffic towards the P-GW after the HO. The same keys are in use between the S-GW and P-GW before the HO. Using the same keys assures that the P-GW can associate the uplink data to the right PDN connection, if the HSGW decides to send uplink data even before the PBA is received in step 8b (note that the P-GW as defined in 23.402 is equipped to receive data with the same GRE key even before updating the binding).

(2a) The eHRPD-eAN/ePCF allocates the requested radio resources and sends an A11-RRQ message to the HSGW. In this message the eAN/ePCF includes the P GW address(es), the associated uplink GRE key(s) for each PDN connection received in step 1c and the indicator that the UE is communicating via a tunnel (ref. Tunnel Mode indicator in A.S0022).

(2b) The HSGW responds with an A11-RRP containing a forwarding address (i.e., HSGW IP address, GRE key(s), and associated APN(s)).

(3) In response to the HRPD Connection Request message received in step 1c, the eHRPD-eAN/ePCF sends the HRPD Traffic Channel Assignment (TCA) message in an S101 message to the MME. The S101 message also carries the HSGW IP address, GRE key(s) for data forwarding, and associated APN(s).

(4a) The MME configures resources for indirect data forwarding and signals the HSGW IP address and GRE key(s) to the S-GW. The S-GW confirms data forwarding resources.

(4b) The MME forwards the HRPD TCA message embedded in the S101 message to the E-UTRAN which forwards it to the UE over the airlink.

(5) E-UTRAN may return downlink IP packets back to the S-GW to be sent to the HSGW over the S103 interface. The HSGW will perform any necessary processing on the IP packets and forward them over the appropriate A10 connection to the eAN/ePCF.

(6a) L2 attach is completed (i.e., the UE acquires the eHRPD radio).

(6b) The UE sends a Traffic Channel Completion (TCC) message to the eHRPD eAN/ePCF.

(7a) The eHRPD eAN/ePCF sends an A11-RRQ carrying an Active Start airlink record and the indicator that the UE is now operating on the eHRPD radio to the HSGW.

(7b) The HSGW responds to the eHRPD eAN/ePCF with an A11-RRP.

(8a) Triggered by step 7a, the HSGW/MAG sends a PBU(s) to establish a PMIPv6 tunnel(s) for each PDN connection(s) with the P GW(s) the UE is associated with. The HSGW uses the NAI received in the Mobile-Node-Identifier AVP upon successful authentication to identify the UE. If MUPSAP is supported at the HSGW, the HSGW includes the PDN Connection ID information element in the PBU message.

(8b) The P GW processes the PBU and updates the binding cache entry for the UE. The same IP address(es) or prefix(es) are assigned to the UE. The P GW/LMA sends a PBA to the HSGW/MAG, including the IP address(es)/prefix(es) allocated for the UE. The PMIPv6 tunnel is now setup. If MUPSAP is supported at the P-GW and PDN Connection ID information element is received in the PBU message, the P-GW includes the same PDN Connection ID information element in the PBA message.

(8c) The P-GW requires configuration for enforcing policy, the P GW sends a Modify IP-CAN session message to the hPCRF. The P GW has requested an IP-CAN session modification, the hPCRF responds to the P GW with a Modify IP-CAN session Ack message. This message includes the Policy and Charging rules provisioned into the P GW.

Note: Steps 8a to 8c are repeated for each PDN connection that is to be established.

(8d) The eHRPD eAN/ePCF signals handoff completion to the MME to confirm HO completion, and receives an acknowledgement.

(9) L3 attach is completed and the UE can now send/receive packets to/from the eHRPD access network.

(10) The E-UTRAN system, including eNodeB, MME, S-GW, and P GW release resources, including sending a PMIPv6 BRI message from the P-GW to the S-GW as specified in TS 29.275. See also TS 23.402.

(11) If the UE had not completed PDN connection and bearer addition/deletion while on E-UTRAN, the UE completes those activities over the eHRPD radio. If any PDN connection is added, or deleted while the UE is operating on E-UTRAN, similar changes are made in the HSGW via the use of VSNCP.

(11a) If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW. The exchanges of AAR/AAA and PBU/PBA messages are not shown in the figure.

(11b) If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

Figure 10:
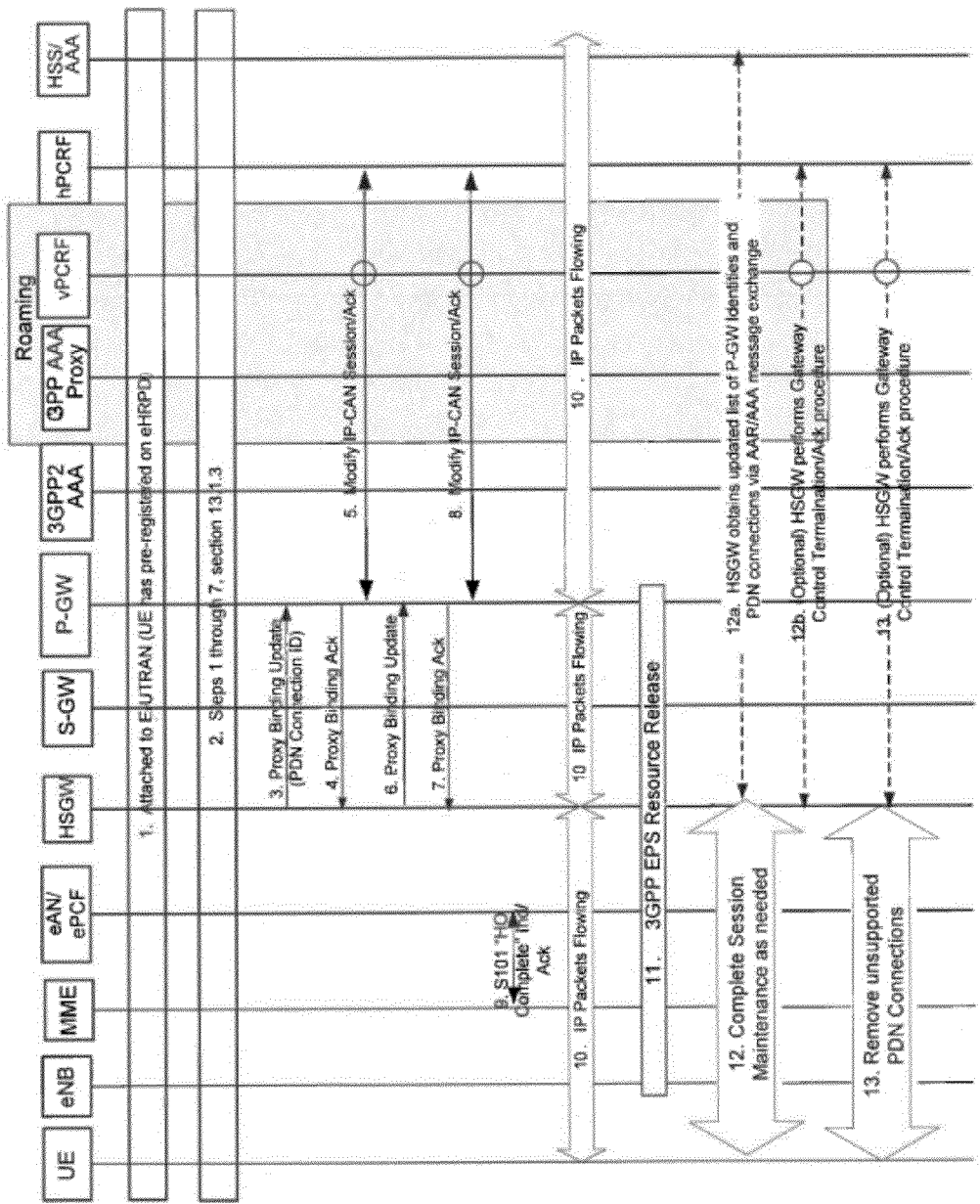
FIG. 10 shows example messages exchanged during active mode optimized handoff from E-UTRAN to eHRPD when P-GW does not support MUPSAP.

With reference to FIG. 10, an example of messages exchanged during active mode optimized handoff from E-UTRAN to eHRPD-P-GW that does not support MUPSAP are now disclosed.

(1) The UE is initially attached to the E-UTRAN. The UE has performed pre-registration of active PDN connections on the eHRPD.

(2) The E-UTRAN receives CDMA measurement reports from the UE and makes a HO decision. The UE sends an HRPD connection request message to the E-UTRAN to request an HRPD traffic channel. This results in setting up traffic channel(s) on the eHRPD and the eAN/ePCF setting up the A10 connection(s) with the HSGW.

If the HSGW supports MUPSAP, the HSGW performs step-3 to step-8 for each APN that has pre-registered PDN connection(s) on it. If the HSGW already knows that the P-GW does not support MUPSAP, step-3 to step-5 are not performed.

If the HSGW does not support MUPSAP, step-3 to step-5 are not performed.

(3) The HSGW/MAG sends a PBU message to establish a PMIPv6 tunnel with the P GW the UE is associated with for the APN. If there are multiple PDN connections to the APN pre-registered at the HSGW, the HSGW picks one of the PDN connections to the APN that it wants to maintain on the eHRPD system. If there is only one pre-registered PDN connection to an APN, that PDN connection is selected. The HSGW uses the NAI received in the Mobile-Node-Identifier AVP upon successful authentication to identify the UE. The HSGW includes PDN Connection ID information element for the chosen PDN connection in the PBU message.

(4) The P GW processes the PBU and updates the binding cache entry for the UE for this APN. As the P-GW does not support MUPSAP, its binding cache entry contains the IP address or prefix assigned to the latest PDN connection to the APN. The P GW/LMA sends a PBA to the HSGW/MAG, including the IP address/prefix allocated to the latest PDN connection to the APN. The PMIPv6 tunnel is now setup. The P-GW returns PBA message without the PDN Connection ID information element.

(5) The P GW requires configuration for enforcing policy, the P GW sends a Modify IP-CAN session message to the hPCRF. The P GW has requested an IP-CAN session modification, the hPCRF responds to the P GW with a Modify IP-CAN session Ack message. This message includes the Policy and Charging rules provisioned into the P GW.

At this stage, the HSGW knows that the P-GW does not support MUPSAP, If there is only one PDN connection to the APN, or if the PDN connection to the APN for which PBU/PBA procedures are performed in steps-3 to step-5 is the latest PDN connection to the APN, step-6 to step-8 are not performed.

(6) The HSGW/MAG sends a PBU message to establish a PMIPv6 tunnel with the P GW the UE is associated with for the APN. If there are multiple PDN connections to the APN pre-registered at the HSGW, the HSGW picks the latest PDN connection to the APN. If the HSGW does not support MUPSAP, the only pre-registered PDN connection to the APN is selected. The HSGW uses the NAI received in the Mobile-Node-Identifier AVP upon successful authentication to identify the UE. The HSGW does not include PDN Connection ID information element in the PBU message.

(7) The P GW processes the PBU and updates the binding cache entry for the UE. The same IP address or prefix are assigned to the UE. The P GW/LMA sends a PBA to the HSGW/MAG, including the IP address/prefix allocated for the UE. The PMIPv6 tunnel is now setup.

(8) The P GW requires configuration for enforcing policy, the P GW sends a Modify IP-CAN session message to the hPCRF. The P GW has requested an IP-CAN session modification, the hPCRF responds to the P GW with a Modify IP-CAN session Ack message. This message includes the Policy and Charging rules provisioned into the P GW.

(9) The eHRPD eAN/ePCF signals handoff completion to the MME to confirm HO completion, and receives an acknowledgement.

(10) L3 attach is completed and the UE can now send/receive packets to/from the eHRPD access network.

(11) The E-UTRAN system, including eNodeB, MME, S-GW, and P GW release resources, including sending a PMIPv6 BRI message from the P-GW to the S-GW as specified in TS 29.275. See also TS 23.402.

(12) If the UE had not completed PDN connection and bearer addition/deletion while on E-UTRAN, the UE completes those activities over the eHRPD radio. In the case of pre-registration with partial context, EPS resources including eNodeB, MME, S-GW are released when the UE sets up the PDN connections over eHRPD. If any PDN connection is added or deleted while the UE is operating on E-UTRAN, similar changes are made in the HSGW via the use of VSNCP.

(12a) If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW. The exchanges of AAR/AAA and PBU/PBA messages are not shown in the figure (12b) If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

(13) If the HSGW supports MUPSAP and has PDN connection(s) to an APN(s) that are not supported by the P-GW, the HSGW removes such PDN connection context information by sending VSNCP Terminate-Request message that includes the PDN-ID of the connection to be deleted. The UE removes the PDN connection context information and responds with a VSNCP Terminate-Ack to the HSGW. The HSGW performs GW Control Session Termination/Ack procedures with the PCRF to remove the GW Control context of the previously pre-registered PDN connection at the HSGW, if such GW Control Session context had been setup for this PDN connection.

Figure 11:
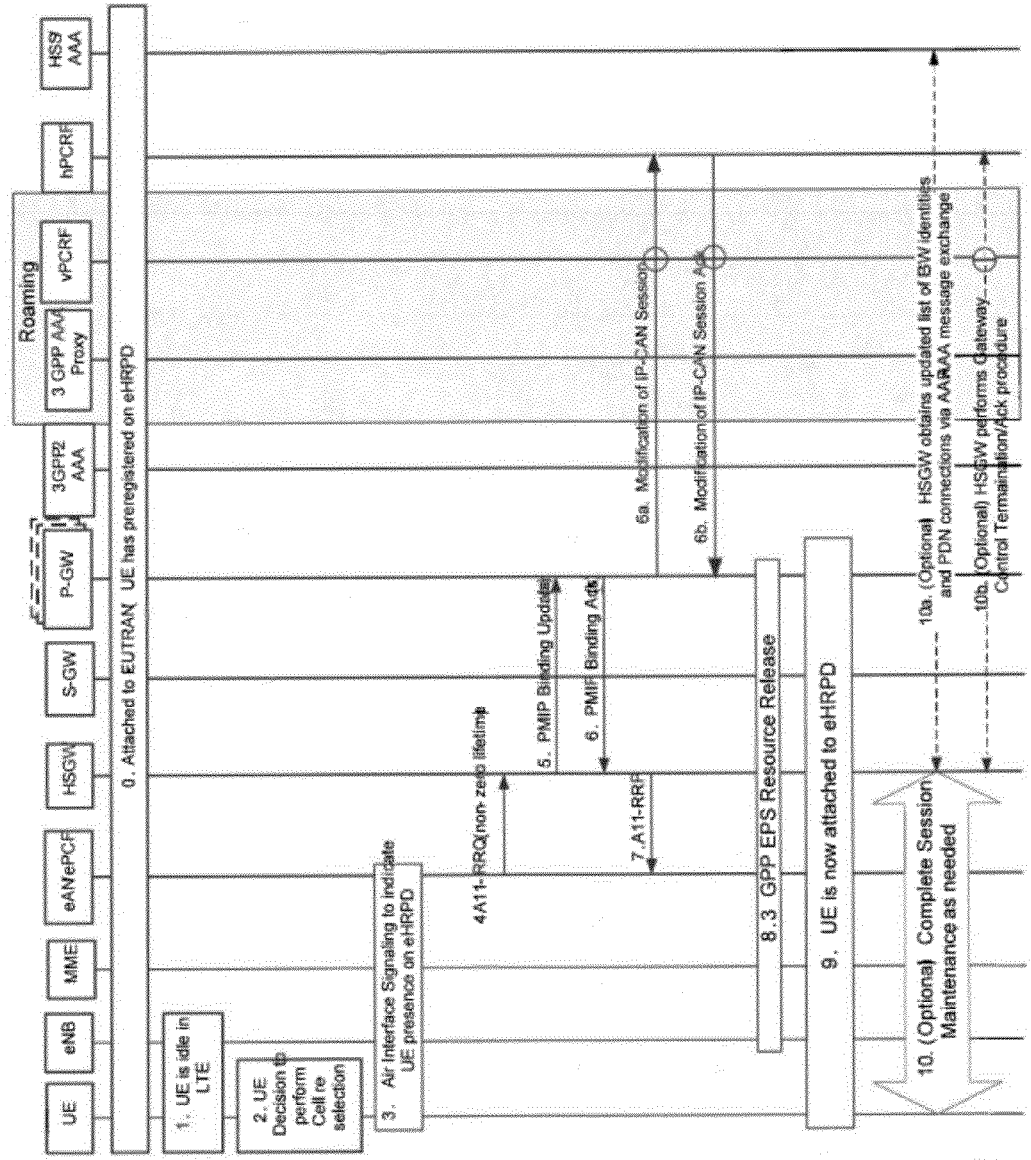
FIG. 11 shows example messages exchanged during an idle mode optimized handoff from E-UTRAN to eHRPD.

With reference to FIG. 11, an example of messages exchanged during an idle mode optimized handoff from E-UTRAN to eHRPD are now discussed.

(1) The UE is attached to the E-UTRAN network and stays in ECM IDLE state. The UE has a dormant eHRPD session in the target eHRPD AN through the pre-registration procedure.

(2) The UE is in idle mode. Based on some trigger, the idle UE decides to perform cell re-selection to the eHRPD AN. Note, the cell re-selection decision can be made at any time when the UE is attached in the E-UTRAN network (including as soon as the UE has completed pre-registration).

(3) The UE follows eHRPD procedures to inform the eAN the UE has performed an inter-technology idle mode mobility event and is now tuned to eHRPD.

(4) The eAN sends an A11-Registration Request for all A10s. This A11-RRQ contains the "tunneled mode indicator" set to '0' to indicate to the HSGW that the UE is operating on the eHRPD radio. If the Tunnel Mode Indicator is not present, then the HSGW assumes that the UE is operating on the eHRPD radio, and thus all PMIP bindings for the UE should be established.

(5) and (6): Upon receipt of the A11-Registration Request message for eHRPD session with nonzero lifetime timer and the Tunnel Mode Indicator is set to '0' or is not present, the HSGW determines that it does not have a PMIPv6 binding(s) for this UE and exchanges PBU/PBA messages with the appropriate P-GW(s). If MUPSAP is supported at the HSGW and the P-GW, the HSGW and the P-GW include the PDN Connection ID information element in the PBU/PBA message(s). The UE address information in PMIPv6 PBA returns the IP Address assigned to the UE. At this point the user plane is switched in the P-GW towards the eHRPD access network via the HSGW. The P-GW updates the HSS/AAA using an exchange of AAR/AAA messages (not shown in the figure).

(6a) and (6b): The P-GW sends an Indication of IP-CAN Session Modification message to the PCRF and PCRF acknowledges. Since steps 6 and 6a are both triggered by the PBU in step 5, steps 6 and 6a may occur in parallel.

NOTE: For multiple PDN connections, steps 5-6 and 6a-6b are performed for each PDN connection.

(7) The A11-Registration Request message is validated and, if new A10 connections are being established, the HSGW accepts the A10 connections by returning an A11-Registration Reply message with an accept indication. This step may occur any time after step 4.

(8) At any time after step 6, the P-GW initiates resource allocation deactivation procedure in E-UTRAN as defined in TS 23.402 subclause 5.6.2.2.

(9) The UE is now attached to eHPRD.

(10) If the UE had not completed PDN connection and bearer addition/deletion while on E-UTRAN, the UE completes those activities over the eHRPD radio. If any PDN connection is added or deleted while the UE is operating on E-UTRAN, similar changes are made in the HSGW via the use of VSNCP.

(10a) If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW, The exchanges of AAR/AAA and PBU/PBA messages are not shown in the figure.

(10b) If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

Figure 12:
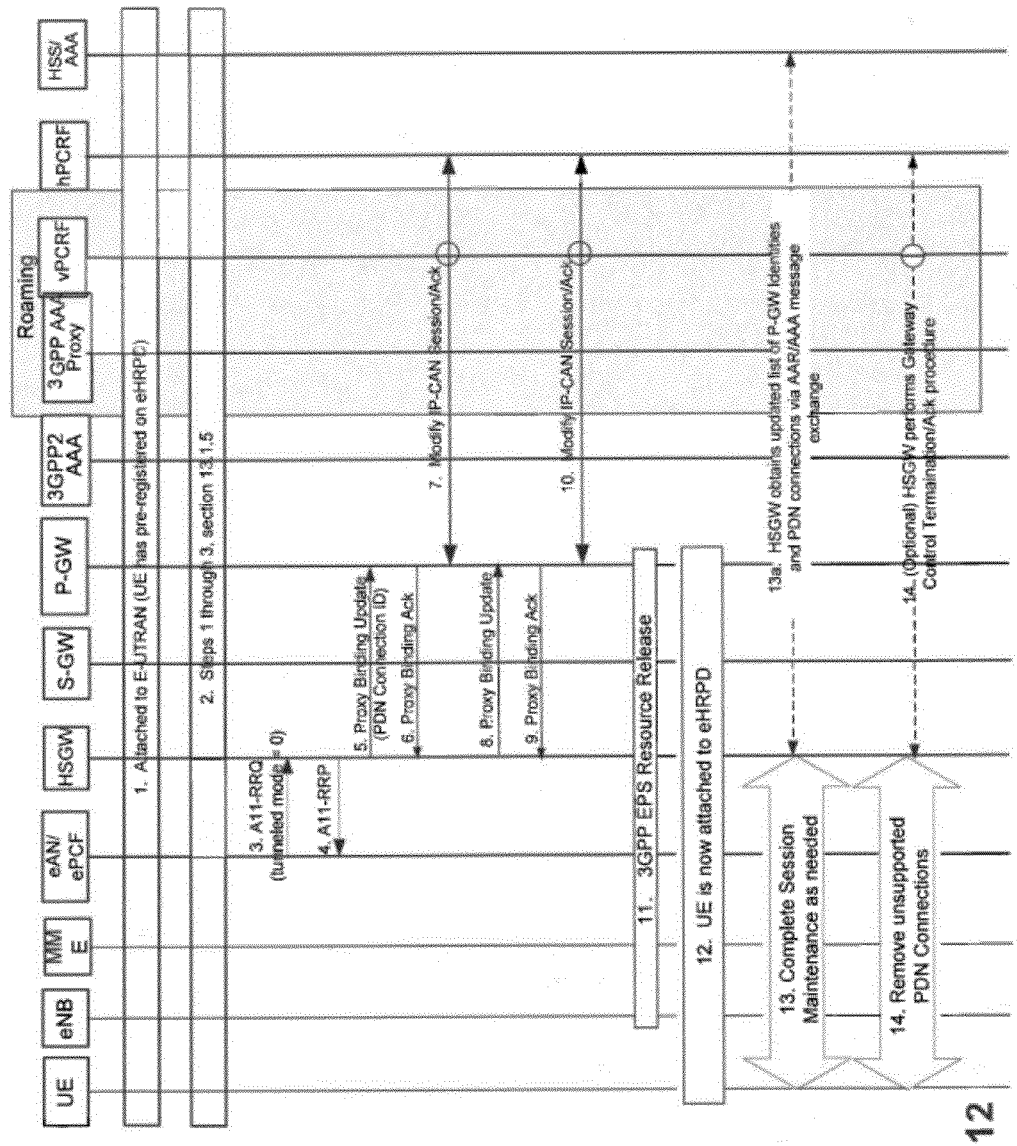
FIG. 12 shows example messages exchanged during an idle mode optimized handoff from E-UTRAN to eHRPD when P-GW does not support MUPSAP.

With reference to FIG. 12, an example of messages exchanged during idle mode optimized handoff from E-UTRAN to eHRPD-P-GW that does not support MUPSAP are now disclosed.

(1) The UE is initially attached to the E-UTRAN. The UE has performed pre-registration of PDN connections on the eHRPD. The UE has a dormant eHRPD session in the eHRPD network through the pre-registration procedure.

(2) The UE is attached to E-UTRAN and in ECM IDLE state. Based on some trigger, the idle UE decides to perform cell re-selection to the eHRPD AN. The UE follows eHRPD procedures to inform the eAN the UE has performed an inter-technology idle node mobility event and is now tuned to eHRPD.

(3) The eAN sends an A11-Registration Request for all A10s. This A11-RRQ contains the "tunneled mode indicator" set to '0' to indicate to the HSGW that the UE is operating on the eHRPD radio. If the Tunnel Mode Indicator is not present, then the HSGW assumes that the UE is operating on the eHRPD radio, and thus all PMIP bindings for the UE should be established.

(4) The HSGW sends A11-Registration Reply to acknowledge the eHRPD access. The A11-Registration Request message is validated and, if new A10 connections are being established, the HSGW accepts the A10 connections by returning an A11-Registration Reply message with an accept indication.

If the HSGW supports MUPSAP, the HSGW performs step-5 to step-10 for each APN that has pre-registered PDN connection on it. If the HSGW already knows that the P-GW does not support MUPSAP, step-5 to step-7 are not performed.

If the HSGW does not support MUPSAP, step-5 to step-7 are not performed.

(5) Triggered by step 3, the HSGW/MAG sends a PBU message to establish a PMIPv6 tunnel with the P GW the UE is associated with for the APN. If there are multiple PDN connections to the APN pre-registered at the HSGW, the HSGW picks one of the PDN connections to the APN that it wants to maintain on the eHRPD system. If there is only one pre-registered PDN connection to an APN, that PDN connection is selected. The HSGW uses the NAI received in the Mobile-Node-Identifier AVP upon successful authentication to identify the UE. The HSGW includes PDN Connection ID information element for the chosen PDN connection in the PBU message (6) The P-GW processes the PBU and updates the binding cache entry for the UE for this APN. As the P-GW does not support MUPSAP, its binding cache entry contains the IP address or prefix assigned to the latest PDN connection to the APN. The P GW/LMA sends a PBA to the HSGW/MAG, including the IP address/prefix allocated to the latest PDN connection to the APN. The PMIPv6 tunnel is now setup. The P-GW returns PBA message without the PDN Connection ID information element.

(7) The P GW requires configuration for enforcing policy, the P GW sends a Modify IP-CAN session message to the hPCRF. The P GW has requested an IP-CAN session modification, the hPCRF responds to the P GW with a Modify IP-CAN session Ack message. This message includes the Policy and Charging rules provisioned into the P GW.

At this stage, the HSGW knows that the P-GW does not support MUPSAP, If there is only one PDN connection to the APN, or if the PDN connection to the APN for which PBU/PBA procedures are performed in steps-5 to step-7 is the latest PDN connection to the APN, step-8 to step-10 are not performed.

(8) The HSGW/MAG sends a PBU message to establish a PMIPv6 tunnel with the P GW the UE is associated with for the APN. If there are multiple PDN connections to the APN pre-registered at the HSGW, the HSGW picks the latest PDN connection to the APN. If the HSGW does not support MUPSAP, the only pre-registered PDN connection to the APN is selected. The HSGW uses the NAI received in the Mobile-Node-Identifier AVP upon successful authentication to identify the UE. The HSGW does not include PDN Connection ID information element in the PBU message.

(9) The P GW processes the PBU and updates the binding cache entry for the UE. The same IP address or prefix are assigned to the UE. The P GW/LMA sends a PBA to the HSGW/MAG, including the IP address/prefix allocated for the UE. The PMIPv6 tunnel is now setup

(10) The P GW requires configuration for enforcing policy, the P GW sends a Modify IP-CAN session message to the hPCRF. The P GW has requested an IP-CAN session modification, the hPCRF responds to the P GW with a Modify IP-CAN session Ack message. This message includes the Policy and Charging rules provisioned into the P GW.

(11) The P GW initiates resource allocation deactivation procedure in E UTRAN as defined in TS 23.402 subclause 5.6.2.2.

(12) The UE is now attached to eHRPD.

(13) If the UE had not completed PDN connection and bearer addition/deletion while on E-UTRAN, the UE completes those activities over the eHRPD radio. If any PDN connection is added or deleted while the UE is operating on E-UTRAN, similar changes are made in the HSGW via the use of VSNCP.

(13a) If the HSGW receives a VSNCP Configure-Request for a PDN connection for which it does not have a P-GW identity, it obtains that information via an AAR/AAA exchange with the HSS/AAA. If the HSGW already has the corresponding P-GW IP address, or receives it from the HSS/AAA associated with the VSNCP Configure-Request message, the HSGW exchanges PBU/PBA messages with the P-GW, The exchanges of AAR/AAA and PBU/PBA messages are not shown in the figure.

(13b) If the HSGW receives a VSNCP Terminate-Request for a PDN connection that contains the PDN-ID of the PDN connection to be deleted, the HSGW removes the PDN connection context information and responds with a VSNCP Terminate-Ack to the UE. The HSGW performs GW Control Session Termination/Ack procedures with the PCRF to remove the GW Control context of the previously pre-registered PDN connection at the HSGW, if such GW Control Session context had been setup for this PDN connection.

(14) If the HSGW supports MUPSAP and has PDN connection(s) to an APN(s) that are not supported by the P-GW, the HSGW removes such PDN connection context information by sending VSNCP Terminate-Request message that includes the PDN-ID of the connection to be deleted. The UE removes the PDN connection context information and responds with a VSNCP Terminate-Ack to the HSGW. The HSGW performs GW Control Session Termination/Ack procedures with the PCRF to remove the GW Control context of the previously pre-registered PDN connection at the HSGW, if such GW Control Session context had been setup for this PDN connection.

Figure 13:
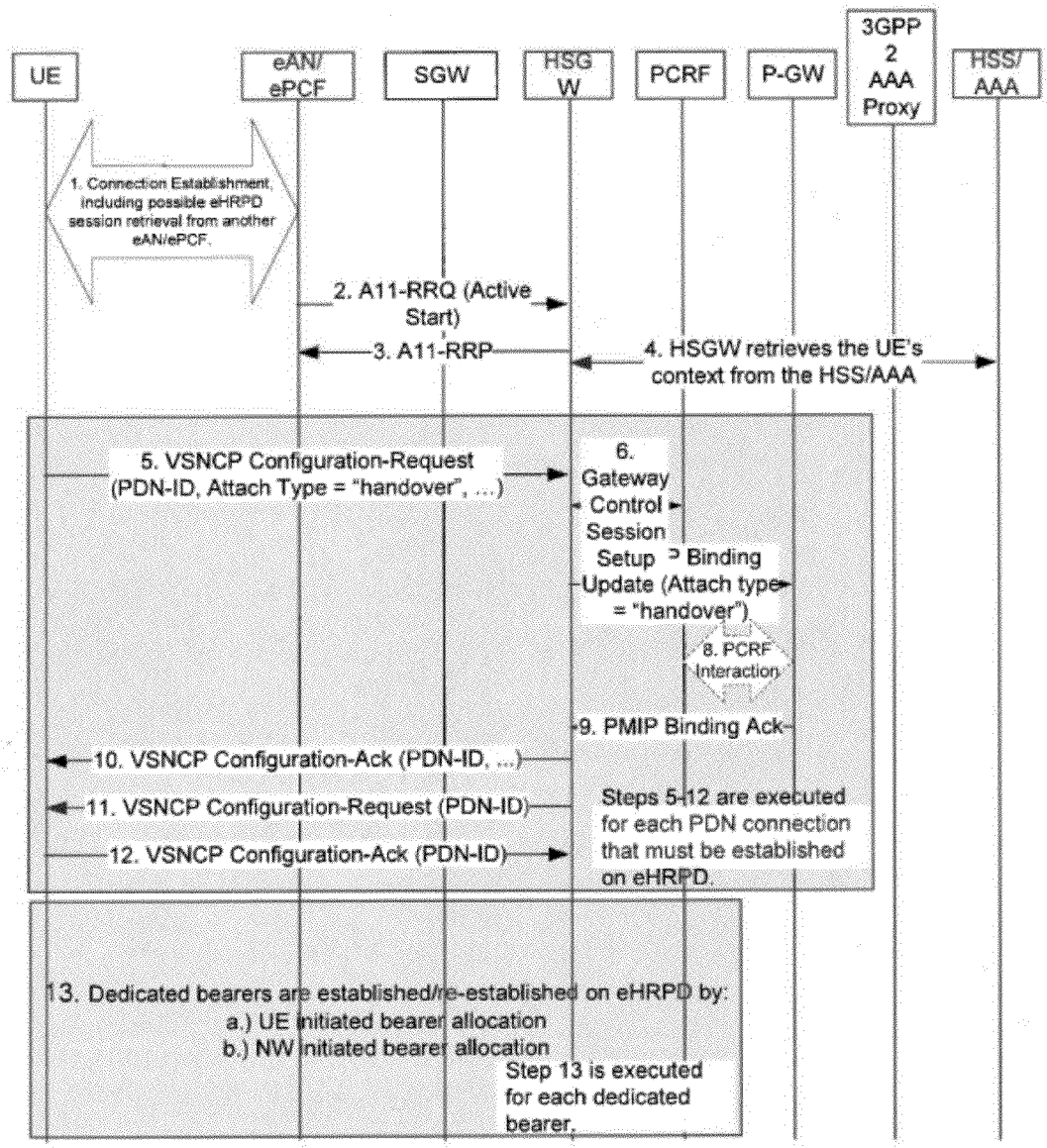
FIG. 13 shows example messages exchanged during a non-optimized handoff from E-UTRAN to eHRPD assuming partial HSGW context.

With reference to FIG. 13, an example of messages exchanged during a non-optimized handoff from E-UTRAN to eHRPD in partial HSGW context are now disclosed.

(1) The UE and the eAN/ePCF reconnect the existing eHRPD session.

(2) The ePCF recognizes that the A10 session associated with the UE is available, and sends an "Active Start" indication in an A11-Registration Request message to the HSGW.

(3) The HSGW responds with an A11-Registration Reply message.

(4) The HSGW retrieves the UE context from the HSS/AAA, including the IP address(es) of P-GW(s) currently in use by the all PDN connections for the UE.

Steps 5-12 are repeated for each PDN connection that the UE re-establishes.

(5) The UE sends a VSNCP Configure-Request message over the main service connection. The information in the message includes a PDN-ID, PDN Type, APN, PDN Address, Protocol Configuration Options, and Attach Type="Handover". User Context Identifier is also included if MUPSAP is supported. When known, PDN Type indicates the UE IP version capability (IPv4, IPv4/IPv6, IPv6), which is the capability of the IP stack associated with the UE. The Protocol Configuration Options indicates whether the UE supports network initiated bearers.

(6) The HSGW performs the Gateway Control Session Establishment procedure with the PCRF (see TS 23.203). As part of this step, the PCRF sends the QoS rules and events to the HSGW.

(7) The HSGW sends a PMIP Binding Update to the P GW in order to update the registration see TS 29.275. If MUPSAP is supported at the HSGW, the HSGW includes PDN Connection ID information element in the PBU message.

(8) The P-GW performs a PCRF interaction to retrieve the QoS policy parameters.

(9) The P-GW responds with a PBA to the HSGW see TS 29.275. If MUPSAP is supported at the P-GW and PDN Connection ID information element is received in the PBU message, the P-GW includes the same PDN Connection ID information element in the PBA message.

(10) The HSGW sends a VSNCP Configure-Ack (PDN-ID, User Context Identifier if PDN Connection ID information element received in the PBA message, APN, PDN Address, PCO, and Attach Type) message to the UE over the main service connection. The Protocol Configuration Options parameter may indicate the Selected Bearer Control Mode.

NOTE: If dynamic policy is not supported, the Selected Bearer Control Mode is "MS-only".

(11) The HSGW sends a VSNCP Configure-Request message to complete the protocol specified in RFC 3772. The message includes the PDN-ID and the IPv4 Default Router Address if an IPv4 address is to be assigned either immediately or deferred. If MUPSAP is supported, the message includes the User Context Identifier configuration option set to the same value as received in the VSNCP Configure-Request message received from the UE.

(12) The UE responds with a VSNCP Configure-Ack message.

Step 13 is repeated as necessary until all bearers for all PDN connections are re-established.

(13) Bearers for a PDN connection are re-established on eHRPD based on the Selected Bearer Control Mode:

(13a) If the Selected Bearer Control Mode is "MS-only", the HSGW assumes that the UE will re-establish all bearers. The UE performs UE requested bearer resource allocation for all bearers. If there is no change to the QoS info, steps are not performed as the QoS info and service connections are retained As part of re-establishing bearers, one or more bearers may need to be deleted with the RAN. The UE performs standard HRPD procedures to remove the corresponding Reservations.

(13b) If the Selected Bearer Control Mode is "MS/NW", the HSGW re-establishes all bearers. The HSGW performs NW initiated dedicated bearer setup. If there is no change to the QoS info steps are not performed as the QoS info and service connections are retained. As part of re-establishing bearers, one or more bearers may need to be deleted.

Note: It is FFS how the stale bearers get deleted in the case the Selected Bearer Control Mode is "MS/NW".

Note: It is FFS how the HSGW informs the UE in "MS/NW" mode about which IP Flows the UE initiates.

Figure 14:
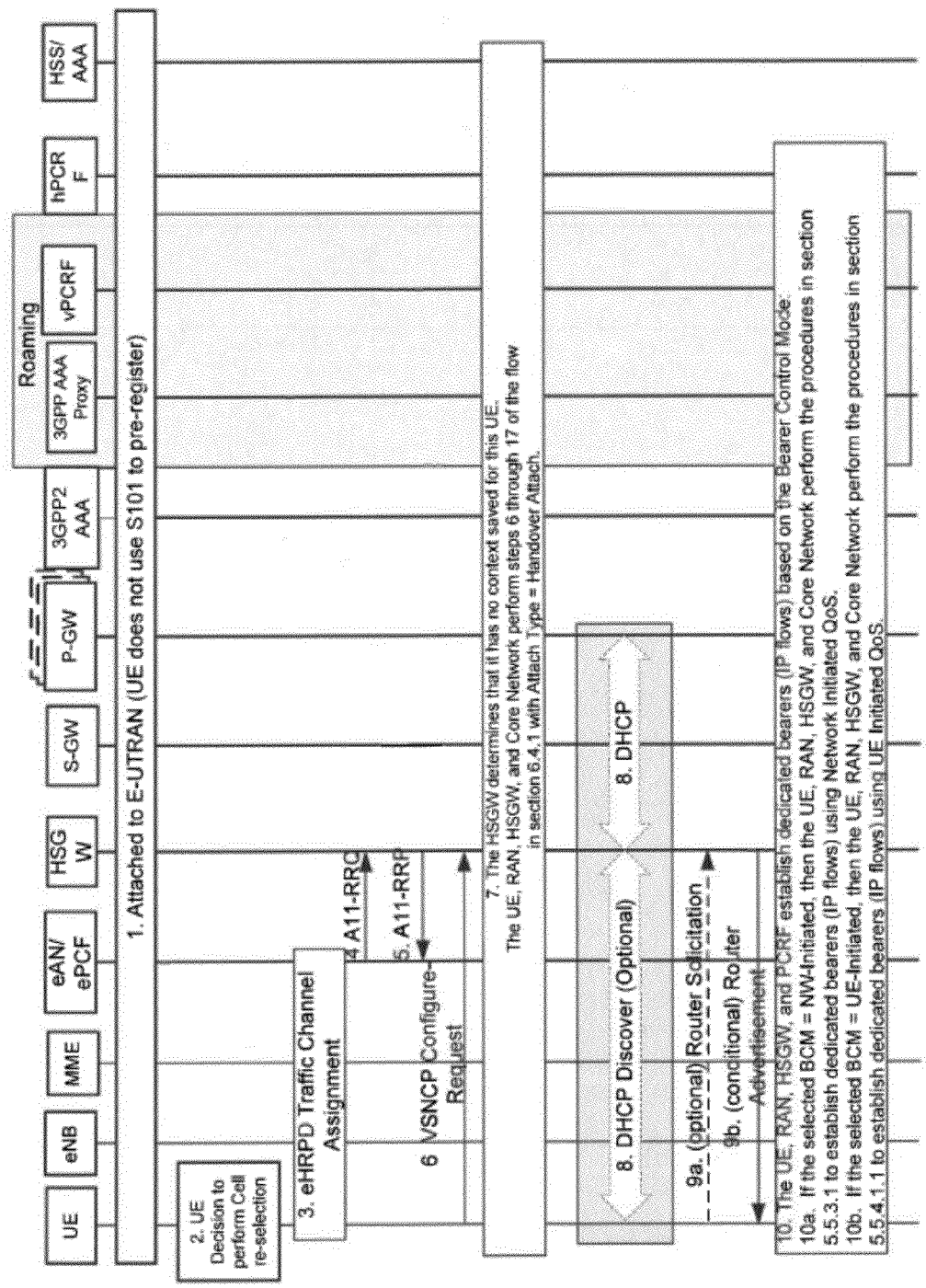
FIG. 14 shows example messages exchanged during a non-optimized handoff from E-UTRAN to eHRPD assuming null HSGW context.

With reference to FIG. 14, an example of messages exchanged during a non-optimized handoff in a null HSGW context are disclosed.

(1) It is assumed that the UE has an existing eHRPD session with the eAN/ePCF, and that the HSGW has no saved context for the UE. The UE does not use S101 to pre-register with eHRPD. When the UE re-attaches to eHRPD, it needs to establish complete context with the HSGW.

(2) The UE is in LTE. Based on some trigger, the UE decides to perform cell re-selection to the eHRPD AN. Note: the cell re-selection decision can be made at any time when the UE is attached in the E-UTRAN network. The eNB may be involved in redirecting the UE to eHRPD.

(3) The UE follows eHRPD procedures to establish connection with the eAN.

(4) Since the eHRPD session is in this subnet, and since no A10 connections exist, the eHRPD eAN/ePCF sends an A11-Registration Request to establish all A10s. This A11-RRQ contains the Tunnel Mode Indicator set to '0' to indicate to the HSGW that the UE is operating on the eHRPD radio. If the Tunnel Mode Indicator is not present, then the HSGW always assumes that the UE is operating on the eHRPD radio.

(5) Triggered by step 4 the HSGW sends A11-Registration Reply to acknowledge the eHRPD access. The A11-Registration Request message is validated.

(6) Since the UE had previously been on eHRPD and had not used S101 to pre-register, the UE sends a VSNCP Configure-Request to the HSGW. User Context Identifier configuration option is also included if MUPSAP is supported. The UE makes the assumption that the HSGW has maintained partial context from the previous time that the UE had established context on eHRPD.

(7) The HSGW notes that it has no saved context for the UE. The HSGW initiates LCP and the other procedures to establish PPP, authentication, CCP, and PDN contexts for the UE. This step may occur prior to the VSNCP Configure-Request being sent in step 6.

(8) (optional step) The UE can now issue a DHCPv4 DISCOVER (optionally w/rapid commit option) message on the BE service connection provided the UE requested deferred IP address allocation.

(9a) The UE may send a Router solicitation message.

(9b) The HSGW sends a Router Advertisement message if the P GW sends the IPv6 prefix to the HSGW.

(10) The UE, RAN, HSGW and PCRF proceed to re-establish dedicated bearers based on the Bearer Control Mode.

(10a) If the selected BCM indicates NW-initiated QoS, then the procedures are executed for each dedicated bearer (IP flow) that was setup on LTE.

Figure 15:
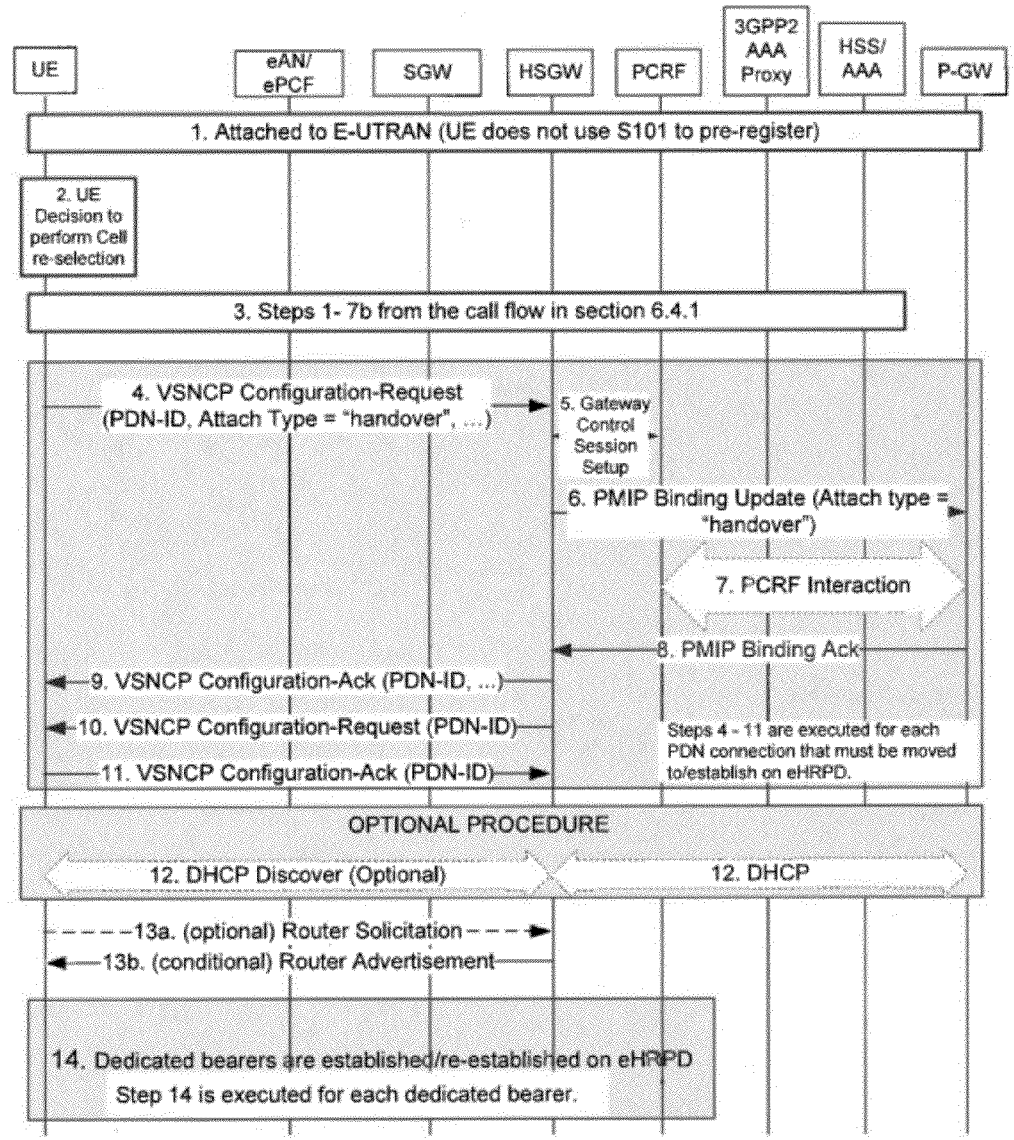
FIG. 15 shows example messages exchanged during a non-optimized handoff from E-UTRAN to eHRPD assuming no existing eHRPD session.

(10b) If the selected BCM indicates UE-initiated QoS, then the procedures are executed for each dedicated bearer (IP flow) that was setup on LTE that the UE wishes to establish With reference to FIG. 15, an example of messages exchanged for facilitating a non-optimized handoff with no existing eHRPD session are disclosed.

(1) It is assumed that the UE does not have an existing eHRPD session with the eAN/ePCF (thus, the HSGW has no saved context for the UE). The UE does not use S101 to pre-register with eHRPD. When the UE re-attaches to eHRPD, it needs to go through full eHRPD session establishment and establish complete context with the HSGW.

(2) The UE is in LTE. Based on some trigger, the UE decides to perform cell re-selection to the eHRPD AN. Note: the cell re-selection decision can be made at any time when the UE is attached in the E-UTRAN network. The eNB may be involved in redirecting the UE to eHRPD.

(3) The UE follows the steps 1 to 7b from the call flow to establish an eHRPD session and a PPP and authentication session with the HSGW.

Steps 4-11 are repeated for each PDN connection that the UE moves from the LTE system.

(4) The UE sends a VSNCP Configure-Request message over the main service connection. The information in the message includes a PDN-ID, User Context Identifier if MUPSAP is supported, PDN Type, APN, PDN Address, Protocol Configuration Options, and Attach Type="Handover". When known, PDN Type indicates the UE IP version capability (IPv4, IPv4/IPv6, IPv6), which is the capability of the IP stack associated with the UE. The Protocol Configuration Options indicates whether the UE supports network initiated bearers.

(5) The HSGW performs the Gateway Control Session Establishment procedure with the PCRF (see TS 23.203). As part of this step, the PCRF sends the QoS rules and events to the HSGW.

(6) The HSGW sends a Proxy Binding Update to the P GW in order to update the registration see TS 29.275. If MUPSAP is supported, the HSGW includes PDN Connection ID information element in the Proxy Binding Update message.

(7) The P GW performs a PCRF interaction to retrieve the QoS policy parameters.

(8) The P GW responds with a PBA to the HSGW see TS 29.275. If MUPSAP is supported at the P-GW and PDN Connection ID information element is received in the PBU message, the P-GW includes the same PDN Connection ID information element in the PBA message.

(9) The HSGW sends a VSNCP Configure-Ack (PDN-ID, User Context Identifier if PDN Connection ID information element received in the PBA message, APN, PDN Address, PCO, and Attach Type) message to the UE over the main service connection. The Protocol Configuration Options parameter may indicate the Selected Bearer Control Mode.

NOTE: If dynamic policy is not supported, the Selected Bearer Control Mode is "MS-only".

(10) The HSGW sends a VSNCP Configure-Request message to complete the protocol specified in RFC 3772. The message includes the PDN-ID and the IPv4 Default Router Address if an IPv4 address is to be assigned either immediately or deferred. If MUPSAP is supported, the message includes the User Context Identifier configuration option set to the same value as received in the VSNCP Configure-Request message received from the UE.

(11) The UE responds with a VSNCP Configure-Ack message.

(12—optional) The UE can now issue a DHCPv4 DISCOVER (optionally with rapid commit option) message on the BE service connection provided the UE requested deferred IP address allocation in Step 8.

(13a) The UE may send a Router solicitation message.

(13b) The HSGW sends a Router Advertisement message if the P GW sends the IPv6 prefix to the HSGW.

Step 14 is repeated as necessary until all bearers for all PDN connections are established.

(14) Bearers for a PDN connection are re-established on eHRPD based on the Selected Bearer Control Mode:

(14a) If the Selected Bearer Control Mode is "MS-only", the HSGW assumes that the UE will establish all bearers. The UE performs UE requested bearer resource allocation for all bearers.

Figures 16, 17:
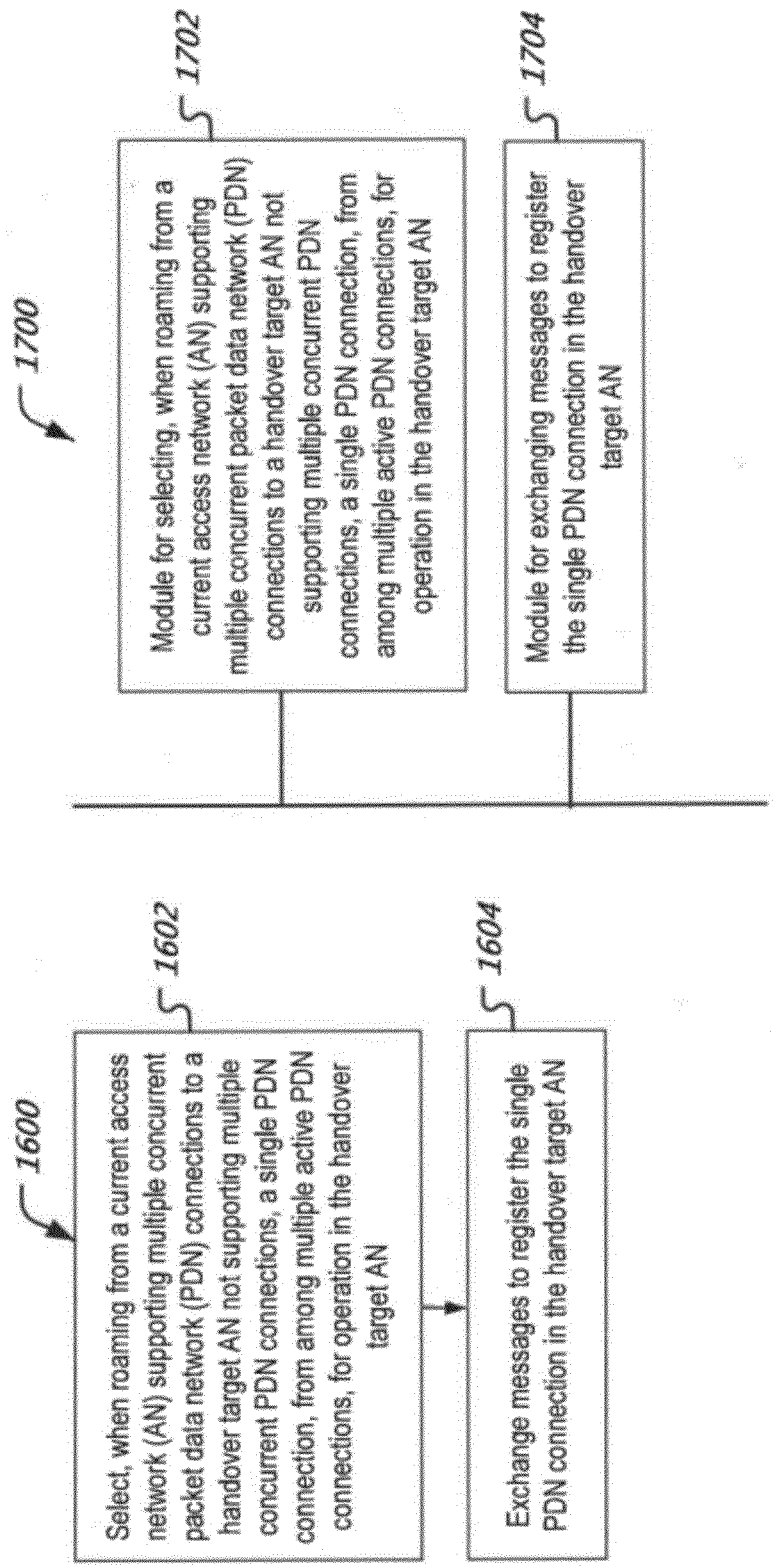
FIG. 16 is a flow chart representation of a process for wireless communications.
FIG. 17 is a block diagram representation of a portion of a wireless communications apparatus.

(14b) If the Selected Bearer Control Mode is "MS/NW", the HSGW establishes all bearers. The HSGW performs NW initiated dedicated bearer setup for all bearers FIG. 16 is a flow chart representation of a process 1600 of wireless communication. At 1602, when roaming from a current access network (AN) supporting multiple concurrent packet data network (PDN) connections to a handover target AN not supporting multiple concurrent PDN connections, a single PDN connection is selected from among multiple active PDN connections, for operation in the handover target AN. The selection may be performed according to one of the techniques discussed herein. At 1604, messages are exchanged to register the single PDN connection in the handover target AN. As discussed herein, in some embodiments, the messages are exchanged between a UE and a gateway server such as the HSGW.

FIG. 17 is a block diagram representation of a portion of a wireless communications apparatus 1700. The module 1702 is for selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN. The module 1704 is for exchanging messages to register the single PDN connection in the handover target AN. The apparatus 1700 and modules 1702, 1704 may further be configured to implement one or more techniques disclosed in this document.

FIG. 18 is a flow chart representation of a process 1800 of wireless communication. At 1802, a network gateway server is provided in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN. At 1804, whether a gateway server in the target AN supports multiple PDN connections to an APN is learned. At 1806, pre-registration of a PDN connection in the target AN is facilitated.

FIG. 19 is a block diagram representation of a portion of a wireless communications apparatus 1900. The module 1902 is for providing a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN. The module 1904 is for learning whether a gateway server in the target AN supports multiple PDN connections to an APN. The module 1906 is for facilitating pre-registration of a PDN connection in the target AN. The apparatus 1900 and modules 1902, 1904, 1906 may be further configured to implement one or more of the techniques disclosed in this document.

It will be appreciated that several techniques are described for enabling handoff of multiple packet data network connections.

It will further be appreciated that several techniques for selecting one of multiple simultaneous packet data network connections when roaming from a current access network supporting multiple concurrent PDN connections to a handover target AN not supporting multiple concurrent PDN connections (i.e., supporting a single PDN connection) are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communications method, comprising:
selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN, wherein the current AN supporting multiple concurrent PDN connections allows multiple PDN connections to an access point name (APN) and the target AN not supporting multiple concurrent PDN connections allows only one PDN connection to the APN; and
exchanging messages to register the single PDN connection in the handover target AN,
wherein the selection of the single PDN connection is based on a set of rules related to an order in which the multiple active PDN connections were established,
wherein the single PDN connection corresponds to a latest PDN connection or a PDN connection for a most valuable application,
wherein if a new PDN connection to the APN is established and there is already a pre-registered PDN connection for the APN in the target AN, the pre-registered PDN connection is not considered the latest PDN connection.

2. The method recited in claim 1, wherein the operation of exchanging messages is based on an operational mode.

3. The method recited in claim 2, wherein the operational mode is one of an active mode, a dormant mode and an idle mode.

4. The method of claim 1, wherein the single PDN connection is an active point to point protocol (PPP) connection.

5. The method of claim 1, wherein the single PDN connection is a dormant point to point protocol (PPP) connection.

6. A wireless communications apparatus, comprising:
means for selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN, wherein the current AN supporting multiple concurrent PDN connections allows multiple PDN connections to an access point name (APN) and the target AN not supporting multiple concurrent PDN connections allows only one PDN connection to the APN; and
means for exchanging messages to register the single PDN connection in the handover target AN,
wherein the selection of the single PDN connection is based on a set of rules related to an order in which the multiple active PDN connections were established,
wherein the single PDN connection corresponds to a latest PDN connection or a PDN connection for a most valuable application,
wherein a new PDN connection is not considered the latest PDN connection if a pre-registered PDN connection already exists in the target AN for the new PDN connection.

7. The apparatus recited in claim 6, wherein the operation of exchanging messages is based on an operational mode.

8. The apparatus recited in claim 7, wherein the operational mode is one of an active mode, a dormant mode and an idle mode.

9. A non-transitory computer program product comprising a non-volatile, computer-readable medium with code stored thereon, the code comprising instructions for:
selecting, when roaming from a current access network (AN) supporting multiple concurrent packet data network (PDN) connections to a handover target AN not supporting multiple concurrent PDN connections, a single PDN connection, from among multiple active PDN connections, for operation in the handover target AN, wherein the current AN supporting multiple concurrent PDN connections allows multiple PDN connections to an access point name (APN) and the target AN not supporting multiple concurrent PDN connections allows only one PDN connection to the APN; and pre-registering for a PDN connection to an access point name (APN) that is to be maintained when operating into the handover target AN, wherein the selection of the single PDN connection is based on a set of rules related to an order in which the multiple active PDN connections were established, wherein the single PDN connection corresponds to a latest PDN connection or a PDN connection for a most valuable application, wherein a new PDN connection is not considered the latest PDN connection if a pre-registered PDN connection already exists in the target AN for the new PDN connection.

10. A wireless communications apparatus, comprising:
a memory for storing instructions; and
a processor for executing the instructions to
select, when roaming from a current access network (AN) supporting multiple concurrent packet data network (PDN) connections to a handover target AN not supporting multiple concurrent PDN connections, a single PDN connection, from among multiple active PDN connections, for operation in the handover target AN, wherein the current AN supporting multiple concurrent PDN connections allows multiple PDN connections to an access point name (APN) and the target AN not supporting multiple concurrent PDN connections allows only one PDN connection to the APN; and
exchange messages to learn whether the handover target AN supports multiple concurrent PDN connections,
wherein the selection of the single PDN connection is based on a set of rules related to an order in which the multiple active PDN connections were established,
wherein the single PDN connection corresponds to a latest PDN connection or a PDN connection for a most valuable application,
wherein a new PDN connection is not considered the latest PDN connection if a pre-registered PDN connection already exists in the target AN for the new PDN connection.

11. The apparatus of claim 10, wherein the single PDN connection is an active point to point protocol (PPP) connection.

12. The apparatus of claim 10, wherein the single PDN connection is a dormant point to point protocol (PPP) connection.

13. A wireless communications method, comprising:
providing a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN, wherein the current AN supporting multiple concurrent PDN connections allows multiple PDN connections to an access point name (APN) and the target AN not supporting multiple concurrent PDN connections allows only one PDN connection to the APN;
wherein the PBU/PBA procedure includes:
learning whether a second gateway server in the target AN supports multiple PDN connections to an APN; and
facilitating pre-registration of a PDN connection in the target AN;
wherein, when the gateway server does not support multiple PDN connections, the PDN connection to the APN corresponds to a rule-based PDN connection, wherein the rule-based connection is one of a latest PDN connection and a PDN connection for a most valuable application.

14. The method recited in claim 13, wherein when the gateway server does not support multiple PDN connections, then the pre-registration is facilitated by transmitting an update message without including a connection identification element.

15. The method of claim 13, wherein the single PDN connection is an active point to point protocol (PPP) connection.

16. The method of claim 13, wherein the single PDN connection is a dormant point protocol (PPP) connection.

17. An apparatus for wireless communications, comprising:
means for providing a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN, wherein the current AN supporting multiple concurrent PDN connections allows multiple PDN connections to an access point name (APN) and the target AN not supporting multiple concurrent PDN connections allows only one PDN connection to the APN;
means for learning whether a gateway server in the target AN supports multiple PDN connections to an APN; and
means for facilitating pre-registration of a PDN connection in the target AN;
wherein, when the gateway server does not support multiple PDN connections, the PDN connection to the APN corresponds to a rule-based PDN connection, wherein the rule-based connection is one of a latest PDN connection and a PDN connection for a most valuable application.

18. A non-transitory computer program product comprising a computer-readable, non-volatile medium having computer-executable code stored thereupon, the code, when executed, causing a computer to:
provide a network gateway server in a current access network (AN) to perform a proxy binding update/proxy binding acknowledge (PBU/PBA) procedure to facilitate roaming of a user equipment from the current AN supporting multiple concurrent packet data network (PDN) connections to an access point name (APN) to a handover target AN, the target handover AN is a target AN, not supporting multiple concurrent PDN connections to an APN, wherein the current AN supporting multiple concurrent PDN connections allows multiple PDN connections to an access point name (APN) and the target AN not supporting multiple concurrent PDN connections allows only one PDN connection to the APN; and
transmit a message indicating whether or not multiple concurrent PDN connections are supported;
facilitate pre-registration of a PDN connection in the target AN;
wherein, when the gateway server does not support multiple PDN connections, the PDN connection to the APN corresponds to a rule-based PDN connection, wherein the rule-based connection is one of a latest PDN connection and a PDN connection for a most valuable application.

19. A system for wireless communications, comprising:
a user equipment configured to:
select, when roaming from a current access network (AN) supporting multiple concurrent packet data network (PDN) connections to a handover target AN not supporting multiple concurrent PDN connections, a single PDN connection, from among multiple active PDN connections, for operation in the handover target AN; and
exchange messages to register the single PDN connection in the handover target AN;
wherein the selection of the single PDN connection is based on a set of rules related to an order in which the multiple active PDN connections were established,
wherein the single PDN connection corresponds to a latest PDN connection or a PDN connection for a most valuable application;
wherein if a new PDN connection to the APN is established and there is already a pre-registered PDN connection for the APN in the target AN, the pre-registered PDN connection is not considered the latest PDN connection; and
a gateway server configured to:
provide a network gateway server in a current access network (AN) for performing a proxy binding update/proxy binding acknowledge (PBU/PBA) procedure to facilitate roaming of a user equipment from the current AN supporting multiple concurrent packet data network (PDN) connections to an access point name (APN) to a handover target AN not supporting multiple concurrent PDN connections to an APN, wherein the current AN supporting multiple concurrent PDN connections allows multiple PDN connections to an access point name (APN) and the target AN not supporting multiple concurrent PDN connections allows only one PDN connection to the APN;
learn whether a gateway server in the target AN supports multiple PDN connections to an APN; and
facilitate pre-registration of a PDN connection in the target AN.

\* \* \* \* \*